US012740906B2

(12) United States Patent
Volk et al.

(10) Patent No.: US 12,740,906 B2
(45) Date of Patent: Sep. 22, 2026

(54) PERSON SUPPORT APPARATUSES INCLUDING INTUBATION ASSISTANCE DEVICES AND METHODS OF USING THE SAME

(71) Applicant: Hill-Rom Services, Inc., Batesville, IN (US)

(72) Inventors: Timothy Michael Volk, Cleves, OH (US); Kathryn Ruth Smith, Batesville, IN (US); Taylor Vohland, West Chester, OH (US); Jnanesha Ramegowda, Batesville, IN (US)

(73) Assignee: HILL-ROM SERVICES, INC., Batesville, IN (US)

( * ) Notice: Subject to any disclaimer, the term of this patent is extended or adjusted under 35 U.S.C. 154(b) by 0 days.

(21) Appl. No.: 18/932,050

(22) Filed: Oct. 30, 2024

(65) Prior Publication Data

US 2025/0177227 A1 Jun. 5, 2025

Related U.S. Application Data

(60) Provisional application No. 63/604,540, filed on Nov. 30, 2023.

(51) Int. Cl.
*A61G 13/12* (2006.01)
*A61G 7/057* (2006.01)

(52) U.S. Cl.
CPC ..... *A61G 13/1215* (2013.01); *A61G 13/1285* (2013.01); *A61G 7/05715* (2013.01)

(58) Field of Classification Search
CPC .............. A61G 13/121; A61G 13/1215; A61G 13/1285; A61G 7/05715; A61G 7/07; A61G 7/072; A61G 13/08; A61G 13/122; A61G 13/1225; A47C 27/142; A47C 27/144; A47C 27/146
See application file for complete search history.

(56) References Cited

U.S. PATENT DOCUMENTS 7,077,141 B2 7/2006 Troop
7,681,262 B2 3/2010 Weedling et al.
(Continued)

FOREIGN PATENT DOCUMENTS

CN 212997149 U 4/2021
CN 110584936 B 10/2021
(Continued)

*Primary Examiner* — Keri J Nelson
(74) *Attorney, Agent, or Firm* — Dinsmore & Shohl LLP

(57) ABSTRACT

Intubation assistance devices, person support surfaces including intubation assistance devices, and person support apparatus including the same are disclosed herein. A person support surface includes a support body and an intubation assistance device positionable within the support body. The intubation assistance device is positionable between a first position and a second position relative to the support body to adjust a position of shoulders of a person positioned on an upper surface of the support body. Other embodiments of intubation assistance devices include an elevated platform moveable relative to a lower plate to raise the shoulders of a person positioned atop a person support surface, and a pivot plate pivotally coupled to the lower plate to support a head of the person as the shoulders are raised.

6 Claims, 15 Drawing Sheets

(56) References Cited

U.S. PATENT DOCUMENTS

| | | | | |
|---|---|---|---|---|
| 8,336,142 | B1 | 12/2012 | See et al. | |
| 8,863,332 | B2 | 10/2014 | Rohr | |
| 8,973,188 | B1 * | 3/2015 | Amini .................... | A61G 9/003 5/604 |
| 9,289,344 | B2 | 3/2016 | Pi | |
| 9,707,152 | B2 | 7/2017 | Lurie et al. | |
| 9,907,716 | B2 | 3/2018 | Miyashita et al. | |
| 10,369,068 | B2 | 8/2019 | Sexton | |
| 10,898,015 | B2 | 1/2021 | Popitz et al. | |
| 11,071,666 | B2 | 7/2021 | Emmons et al. | |
| 11,122,908 | B2 | 9/2021 | Ribble et al. | |
| 2011/0056502 | A1 | 3/2011 | Davis et al. | |
| 2015/0026895 | A1 * | 1/2015 | Geelen ................. | A47C 27/082 5/699 |
| 2017/0028149 | A1 | 2/2017 | Pedro et al. | |
| 2022/0313526 | A1 | 10/2022 | Kaikenger et al. | |
| 2023/0095213 | A1 | 3/2023 | Borgman et al. | |
| 2023/0126248 | A1 | 4/2023 | Kerner | |

FOREIGN PATENT DOCUMENTS

| | | | |
|---|---|---|---|
| CN | 217246051 | U | 8/2022 |
| CN | 217430392 | U | 9/2022 |
| CN | 110236869 | A | 2/2024 |
| DE | 202020001407 | U1 | 4/2020 |
| WO | 2013158580 | A2 | 10/2013 |
| WO | 2022198276 | A1 | 9/2022 |

* cited by examiner

PERSON SUPPORT APPARATUSES INCLUDING INTUBATION ASSISTANCE DEVICES AND METHODS OF USING THE SAME

CROSS-REFERENCE TO RELATED APPLICATION

This application claims the benefit of U.S. Provisional Patent Application Ser. No. 63/604,540, filed Nov. 30, 2023, for "Person Support Apparatuses Including Intubation Assistance Devices And Methods Of Using The Same," which is hereby incorporated by reference in its entirety including the drawings.

TECHNICAL FIELD

The present specification generally relates to person support apparatuses and, more specifically, person support apparatuses including devices for assisting with intubation.

BACKGROUND

Caregivers routinely need to intubate subjects, which can include raising the subject's chest and tilting the subject's head backwards to aide in opening up the subject's airway. Current practice includes placing objects such as, for example, towels, sheets, and the like, behind the subject's shoulders to help elevate the subject's neck region to allow the subject's head to tilt backwards. This requires a separate caregiver, typically a nurse, to find the required objects and to properly position the subject and the objects relative to the subject. Using external objects is time consuming, cumbersome, and increases risk of contamination to the subject's garment, while also requiring the subject to be disturbed to complete the procedure.

SUMMARY

In one embodiment, a person support surface includes: a support body having a head end and a foot, opposite the head end, an upper surface, and a lower surface opposite the upper surface, a cavity formed in the support body; and an intubation assistance device positionable within the support body, the intubation assistance device positionable between a first position and a second position relative to the support body to adjust a position of shoulders of a person positioned on the upper surface of the support body.

In another embodiment, an intubation assistance device includes: a lower plate; an elevated platform; and one or more pivot arms pivotally coupling the lower plate to the elevated platform, wherein the intubation assistance device is positionable between a lowered position in which the elevated platform is spaced apart from the lower plate by a first distance, wherein the intubation assistance device is positionable between a raised position in which the elevated platform is spaced apart from the lower plate by a second distance greater than the first distance.

In yet another embodiment, an intubation assistance device includes: a lower plate; a pivot plate pivotally coupled to the lower plate; and one or more handles positionable between a biased position in which movement of the pivot plate relative to the lower plate is inhibited, and an unbiased position in which rotation of the pivot plate relative to the lower plate about a pivot axis is permitted, wherein the pivot plate is selectively positionable between a neutral position, a raised position, and a lowered position relative to the lower plate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
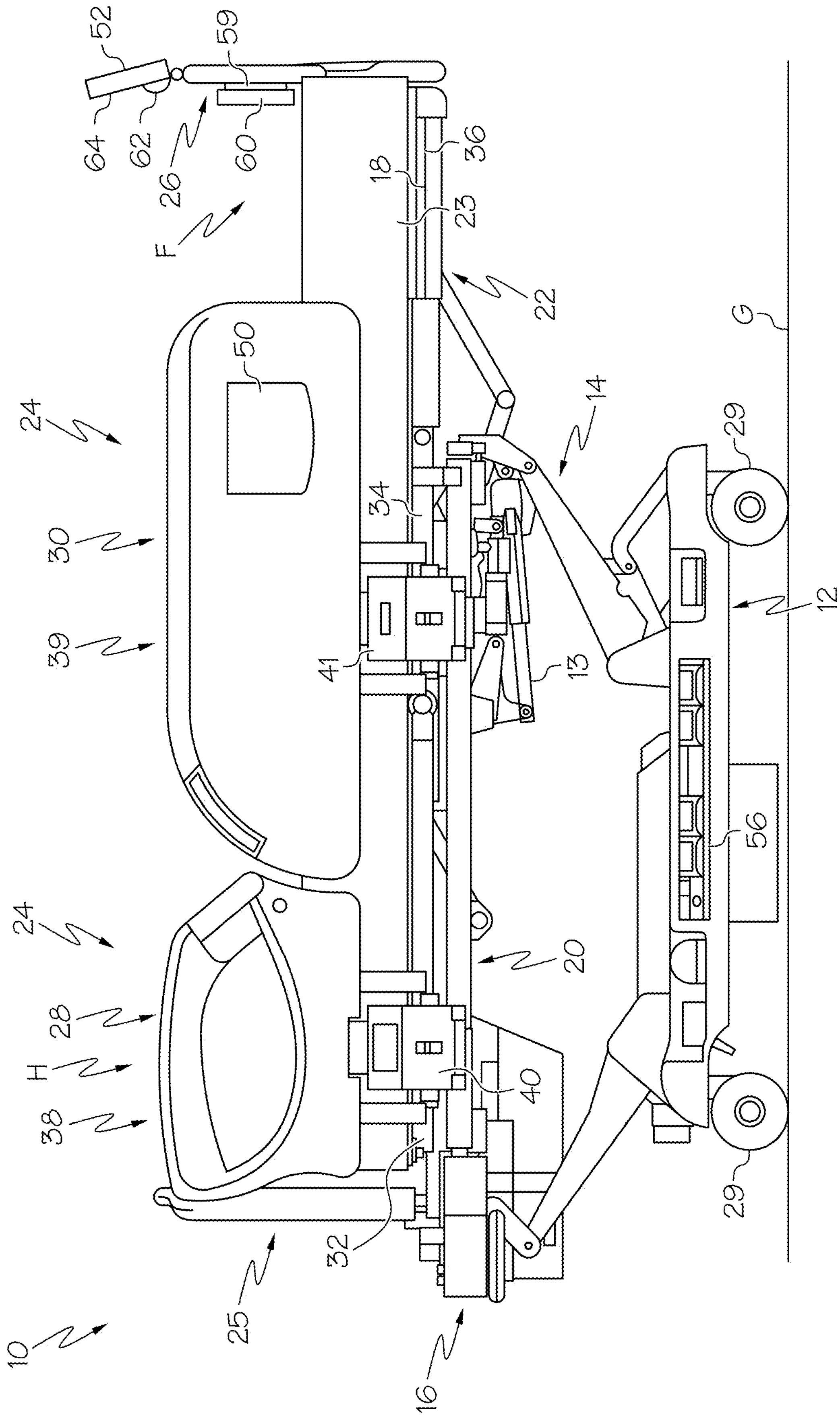
FIG. 1 schematically depicts a side view of an illustrative person support apparatus, according to one or more embodiments shown and described herein.

Embodiments described herein are directed to intubation assistance devices, person support surfaces including intubation assistance devices, and person support apparatus including the same. A person support surface includes a support body and an intubation assistance device positionable within the support body. The intubation assistance device is positionable between a first position and a second position relative to the support body to adjust a position of shoulders of a person positioned on an upper surface of the support body. Other embodiments of intubation assistance devices include an elevated platform moveable relative to a lower plate to raise the shoulders of a person positioned atop a person support surface, and a pivot plate pivotally coupled to the lower plate to support a head of the person as the shoulders are raised.

Various embodiments of the person support apparatuses and the operation of the person support apparatuses are described in more detail herein. Whenever possible, the same reference numerals will be used throughout the drawings to refer to the same or like parts. By providing a movable block positioned relative to the head section of the person support apparatus or operating a pivoting plate between a raised position and a lowered position, the person may be positioned without utilizing external objects. As noted herein, positioning such external objects increase risk of contamination and disrupt the person prior to intubation.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

A person support apparatus 10 according to various embodiments is depicted in FIG. 1. The person support apparatus 10 can be, for example, a hospital bed, a stretcher, a subject lift, a chair, an operating table, or similar support apparatuses commonly found in hospitals, nursing homes, rehabilitation centers or the like. As shown in FIG. 1, the person support apparatus 10 includes a base frame 12, a plurality of lift members 14 coupled to the base frame 12, and an upper frame 16 movably supported by the plurality of lift members 14 above the base frame 12. The base frame 12 includes a plurality of wheels or casters 29 that are movable along ground surface G. In various embodiments, the person support apparatus 10 includes a support surface 18 that is supported by the upper frame 16. The support surface 18 has a first section, designated as head end H, and a second section, designated as foot end F. The support surface 18 may be, for example, a deck 22. The deck 22 includes a head section 32, a seat section 34, and a foot section 36, which engage a bottom surface of a person support surface 23. In embodiments, the person support surface 23 is a mattress or any other suitable surface on which a person is positioned. The person support surface 23 may include one or more layers of padding, insulation, covers, and the like.

The lift members 14 are coupled to various linear actuators 13 (such as jack motors and the like) and related mechanical and electrical components which facilitate raising, lowering, and tilting of the upper frame 16, and thus the support surface 18, with respect to the base frame 12. Tilting of the support surface 18 relative to the base frame 12 may also be referred to herein as orienting the support surface 18 in a Trendelenburg orientation or a reverse Trendelenburg orientation. In a Trendelenburg orientation, the head end H of the support surface 18 is lower than the foot end F of the support surface 18 while in a reverse Trendelenburg orientation, the foot end F of the support surface 18 is lower that the head end H of the support surface 18.

In embodiments, the upper frame 16 can include an upper frame base 20 which supports the deck 22. The person support apparatus 10 may further include side rails 24, a headboard 25, and a footboard 26. The side rails 24, the headboard 25, and the footboard 26 are supported by the upper frame 16, as shown in FIG. 1. The side rails 24, the headboard 25, and the footboard 26 are affixed to the upper frame 16 such that they generally define the perimeter edge of the upper frame 16. In some embodiments, the side rails 24 may include multiple sections. For example, in some embodiments, the side rails 24 may each include a head side rail 28, located adjacent to the head end H of the support surface 18, and an intermediate side rail 30 positioned between the head side rail 28 and the foot end F. At least one of the side rails 24 may include a first user interface 50 for control and/or display of the features of the person support apparatus 10. Foot pedal controls 56 may be coupled to the base frame 12 and communicatively coupled to one or more actuators, motors, or the like for raising and lowering the height of the upper frame 16.

As noted above, the upper frame base 20 is coupled to the lift members 14 and supports the support surface 18. In some embodiments, the foot section 36 may be coupled to the upper frame base 20 and moves between a raised position and a lowered position with respect to the upper frame base 20. For example, a linear actuator (not shown) may be coupled to the foot section 36 of the deck 22 in order to enable the length of the person support apparatus 10 to be adjusted. For example, the foot section 36, when extendable, may be retracted to shorten the length of the person support apparatus 10, but may be extended to lengthen the person support apparatus 10. In embodiments, automatic (i.e., active) extension and retraction of the foot section 36 may be accomplished with the actuator, which may automatically extend and retract the foot section 36 based on signals received from a control unit. In embodiments, the foot section 36 may also be slidable with respect to the upper frame base 20 such that the actuator provides a passive assist in facilitating leg presses. As such, the subject presses against the foot section 36, thereby extending the actuator and sliding the foot section 36 away from the upper frame base 20.

In some embodiments, the head side rail 28 is coupled to the head section 32 of the deck 22 and the intermediate side rail 30 is coupled to the seat section 34 of the deck 22. The head side rail 28 includes a side rail body 38 and a movement assembly 40. The movement assembly 40 movably couples the side rail body 38 to the upper frame 16 and move the side rail body 38 between a deployed position and a stowed position. When the head side rail 28 is in the deployed position, at least a portion of the head side rail 28 is positioned above the deck 22 and/or the person support surface 23. When the head side rail 28 is in the stowed position, the head side rail 28 is positioned below at least the person support surface 23. In embodiments, the head side rail 28 may also be positioned below the deck 22 when in the stowed position. In some embodiments, the movement assembly 40 includes a locking mechanism (not shown) that maintains the side rail body 38 in the deployed position and/or the stowed position.

The intermediate side rail 30 includes a side rail body 39 and a movement assembly 41. The movement assembly 41 movably couples the side rail body 39 to the upper frame 16 and move the side rail body 39 between a deployed position and a stowed position. When the intermediate side rail 30 is in the deployed position, at least a portion of the intermediate side rail 30 is positioned above the deck 22 and/or the person support surface 23. When the intermediate side rail 30 is in the stowed position, the intermediate side rail 30 is positioned below at least the person support surface 23. In embodiments, the intermediate side rail 30 may also be positioned below the deck 22 when in the stowed position. In some embodiments, the movement assembly 41 includes a locking mechanism (not shown) that maintains the side rail body 39 in the deployed position and/or the stowed position.

The head section 32 and the foot section 36 are each movable relative to the seat section 34. For example, the head section 32 and the foot section 36 pivotally raise and lower relative to the seat section 34. The person support surface 23 is flexible such that it can be articulated along with the support surface 18, as discussed below. The person support apparatus 10 includes one or more motors or actuators, which in some embodiments, include linear actuators with electric motors to move the head section 32 and the foot section 36 relative to upper frame 16 and operate the lift members 14 to raise, lower, and tilt the upper frame 16 relative to base frame 12. It should be appreciated that these actuators are separate and distinct from the actuators that form the lift members 14 provided between the base frame 12 and the upper frame 16 for moving the upper frame 16 relative to the base frame 12. These actuators are well-known in the hospital bed art and thus, are not illustrated herein. Alternative actuators or motors contemplated by this disclosure include hydraulic cylinders and pneumatic cylinders, for example.

In the illustrative embodiment, the seat section 34 is fixed in position with respect to the upper frame 16 as the deck 22 moves between its various subject supporting positions including a horizontal position, shown in FIG. 1, to support the subject in a supine position, for example, and a chair position, to support the subject in a sitting up position. In embodiments, the seat section 34 moves relative to the base frame 12, such as by pivoting and/or translating the entire deck 22. Of course, in those embodiments in which seat section 34 pivots and/or translates, the head section 32 and the foot section 36 also move along with seat section 34.

The person support apparatus 10 further includes a plurality of user interfaces. In the embodiment of the person support apparatus 10 shown in FIG. 1, a first user interface 50 is located on an outer surface of one of the intermediate side rails 30. A second user interface 52 is coupled to the footboard 26. However, it should be understood that the user interfaces 50, 52 may be located elsewhere on the person support apparatus 10. In embodiments, the user interface 52 may include a speaker 62 and/or a display 64. Each of the user interfaces 50, 52 includes user interface hardware components such as buttons, joysticks, touchscreens, and other suitable user controls for operating the respective user interface 50, 52. In embodiments, the user interface 52 may be communicatively coupled to a pressure surface 60 which is mounted to the footboard 26 of the person support apparatus. In the embodiment shown in FIG. 1, the footboard 26 is located near the foot end F and extends above the support surface 18. The pressure surface 60 may include a sensor 59, such as a flexing force pressure sensor, which measures the amount of force applied to the sensor 59. As noted hereinabove, the second user interface 52 may be in the form of or include a display 64. The display 64 may be a touchscreen, LCD (Liquid Crystal Display) screen, or other suitable display.

Figure 2A:
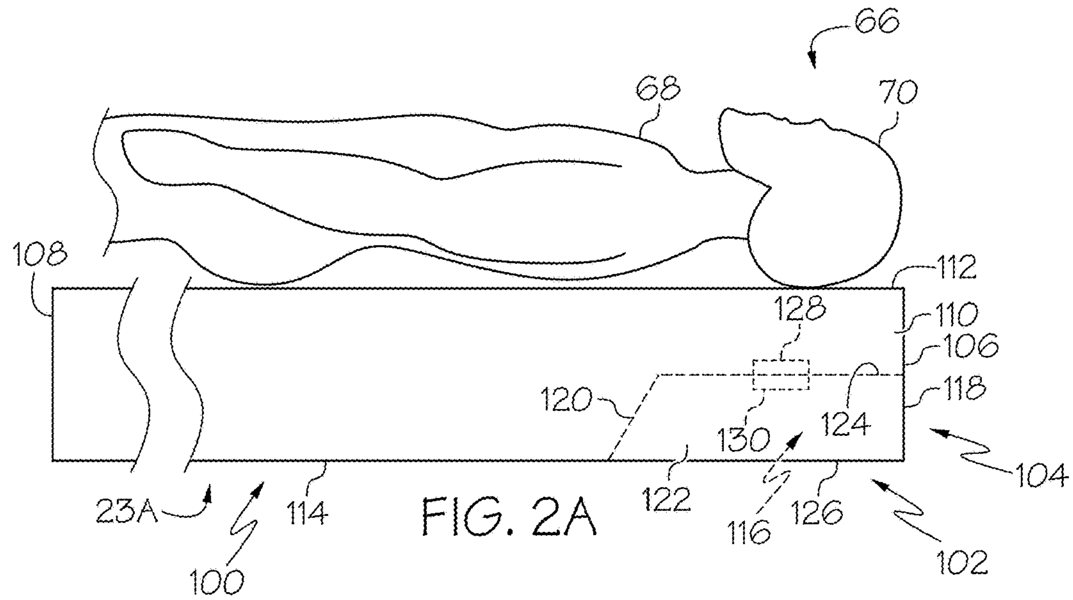
FIG. 2A schematically depicts a side view of an embodiment of a person support apparatus in a first position, according to one or more embodiments shown and described herein.
Figure 2B:
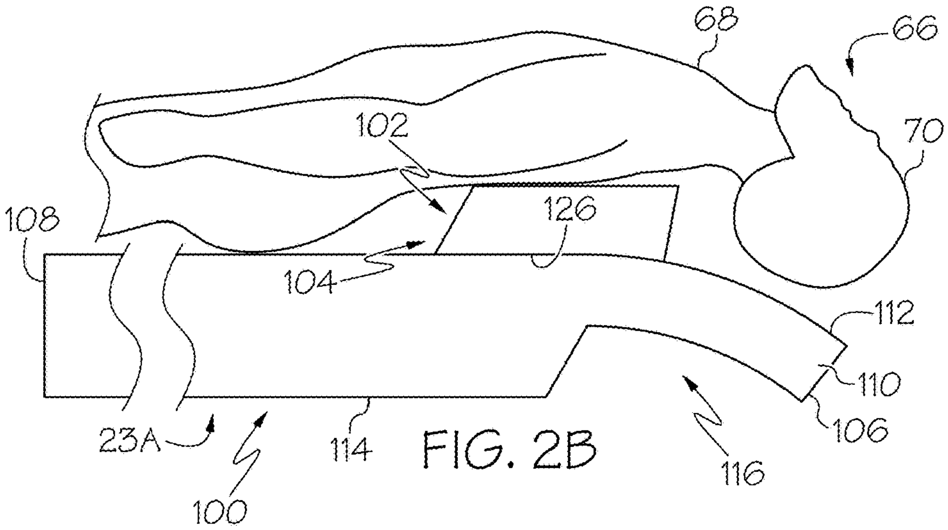
FIG. 2B schematically depicts a side view of the person support apparatus of FIG. 2A in a second position, according to one or more embodiments shown and described herein.
Figure 2C:
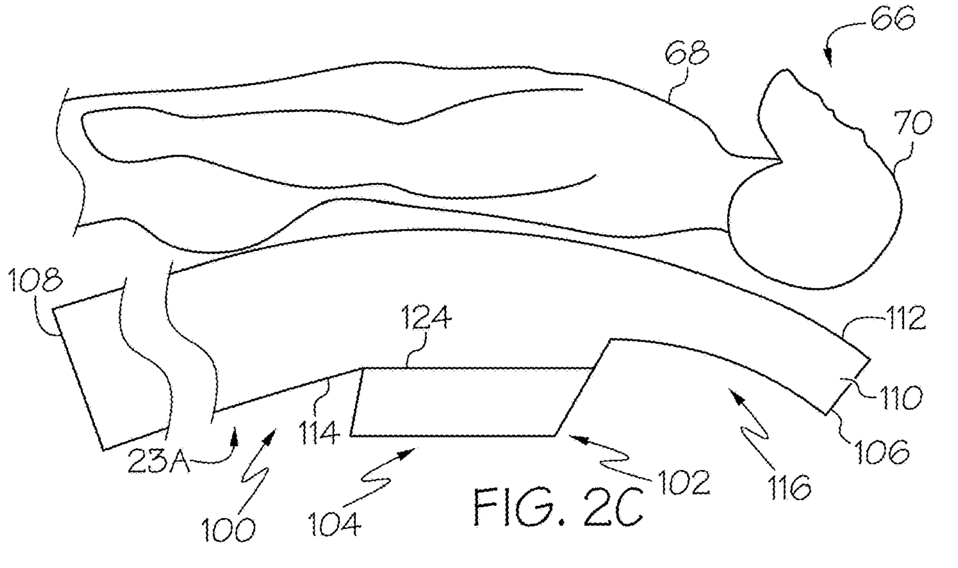
FIG. 2C schematically depicts a side view of the person support apparatus of FIG. 2A in a third position, according to one or more embodiments shown and described herein.

Referring now to FIGS. 2A-2C, an embodiment of a person support surface 23A is depicted on which a person 66 is positioned. In embodiments, the person 66 is similar in size to an AM 50 dummy. It should be appreciated that the person support surface 23A is similar to the person support surface 23 discussed herein and depicted in FIG. 1. However, the person support surface 23A includes a support body 100 and a removable support block 102, as an intubation assistance device 104, received within the support body 100, as discussed herein. In embodiments, the removable support block 102 may define a platform on the person 66 may be situated.

The support body 100 of the person support surface 23A includes a head end 106, a foot end 108 opposite the head end 106, a pair of sides 110, an upper surface 112, and a lower surface 114 opposite the upper surface 112. The sides 110, the upper surface 112, and the lower surface 114 extend between the head end 106 and the foot end 108. A cavity 116 is formed in the support body 100 at the head end 106 and the lower surface 114 of the support body 100 in which the removable support block 102 may be positioned. In embodiments, the cavity 116 has a width extending through the sides 110 of the support body 100. In other embodiments, the width of the cavity 116 does not extend through the sides 110 of the support body 100. Accordingly, in such embodiments, the cavity 116 is defined by the sides 110 of the support body 100. As described in more detail herein, the cavity 116 has a shape corresponding to a shape of the removable support block 102 such that the person support surface 23A has a generally uniform shape when the removable support block 102 is received within the cavity 116 of the support body 100.

Although not shown, it should be appreciated that the person support surface 23A may include one or more covers either partially or completely surrounding the support body 100 and the removable support block 102 when positioned within the cavity 116 of the support body 100. However, the cover may be configured, either by being partially removed, detached, or providing an access window, to allow the removable support block 102 to be removed from the cavity 116 of the support body 100.

In embodiments, the removable support block 102 has a trapezoidal prism shape. Accordingly, the removable support block 102 has a first end 118, a second end 120 opposite the first end 118, a pair of sides 122, an upper surface 124, and a lower surface 126 opposite the upper surface 124. The sides 122, the upper surface 124, and the lower surface 126 extend between the first end 118 and the second end 120. In the present embodiment in which the removable support block 102 has a trapezoidal prism shape, the first end 118 and the second end 120 are non-parallel to one another. However, it should be appreciated that the removable support block 102 may have any suitable shape corresponding to a shape of the cavity 116. For example, the removable support block 102 may have a cylindrical shape, a spherical shape, a cube or cuboid shape, or the like.

The removable support block 102 has a width extending between the sides 122 of the removable support block 102. In embodiments, the width of the removable support block 102 is equal to a width of cavity 116. In other embodiments, the width of the removable support block 102 may be less than the width of cavity 116.

In embodiments, the removable support block 102 is not attached to the support body 100 such that the removable support block 102 may be readily removed from within the cavity 116 of the support body 100 without manipulating any attachment mechanisms. In other embodiments, the support body 100 and/or the removable support block 102 may include one or more attachment mechanisms for facilitating attachment and detachment of the removable support block 102 to the support body 100. For example, the attachment mechanisms may include magnets, clasps, hook and loop fasteners, clips, buckle, brackets, tracks, and the like. More particularly, the support body may include a first attachment mechanism 128, and the removable support block 102 may include a second attachment mechanism 130. With the removable support block 102 positioned within the cavity 116 of the support body 100, the first attachment mechanism 128 may be configured to engage the second attachment mechanism 130 to secure the removable support block 102 to the support body 100.

As shown in FIGS. 2B and 2C, the removable support block 102 may be removed from the cavity 116 of the support body 100 and positioned at either the upper surface 112 or the lower surface 114 of the support body 100 to raise the shoulders 68 of the person 66 relative to the head 70 of the person 66 situated on the person support surface 23A. As described herein, this is the optimal position for positioning a person during intubation. Specifically, this positions the head 70 of the person 66 backward at an angle for intubation. The particular angle for intubation is defined by an oral axis extending through the mouth of the person 66 and a laryngeal axis extending through the throat of the person 66 being greater than 90 degrees.

As shown in FIG. 2B, the removable support block 102 is shown removed from the cavity 116 of the support body 100 with the lower surface 126 of the removable support block 102 positioned on the upper surface 112 of the support body 100. The first end 118 of the removable support block 102 is positioned away from the head end 106 of the support body 100 to permit the head 70 of the person 66 to be lowered relative to the shoulders 68 of the person 66.

As shown in FIG. 2C, the removable support block 102 is shown removed from the cavity 116 of the support body 100 with the upper surface 124 of the removable support block 102 positioned on the lower surface 114 of the support body 100. The first end 118 of the removable support block 102 is positioned away from the head end 106 of the support body 100 to permit the head 70 of the person 66 to be lowered relative to the shoulders 68 of the person 66. As described herein, the attachment mechanism may include tracks. For example, a first track may be provided on the lower surface 114 of the support body 100 and extending along the cavity 116, and a second track may be provided on the upper surface 124 of the removable support block 102 that engages the first track. Accordingly, the removable support block 102 may be permitted to slide out of the cavity 116 and along the lower surface 114 of the support body 100 to result in the position depicted in FIG. 2C without having to completely remove the removable support block 102 from the support body 100.

Figure 3A:
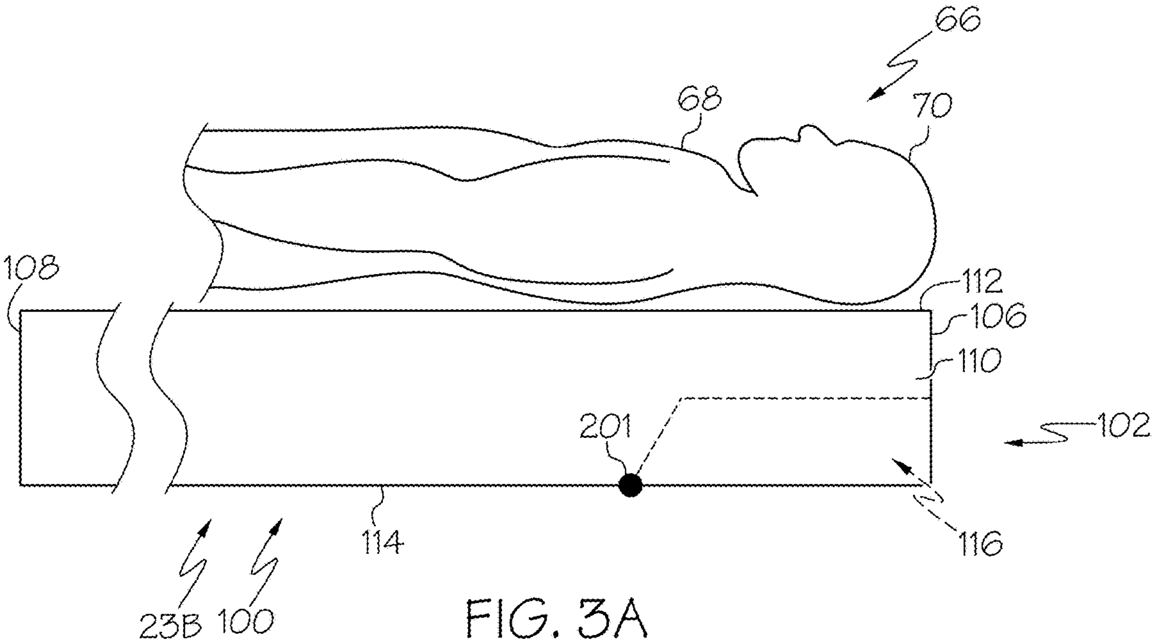
FIG. 3A schematically depicts a side view of an embodiment of a person support apparatus in a first position, according to one or more embodiments shown and described herein.
Figure 3B:
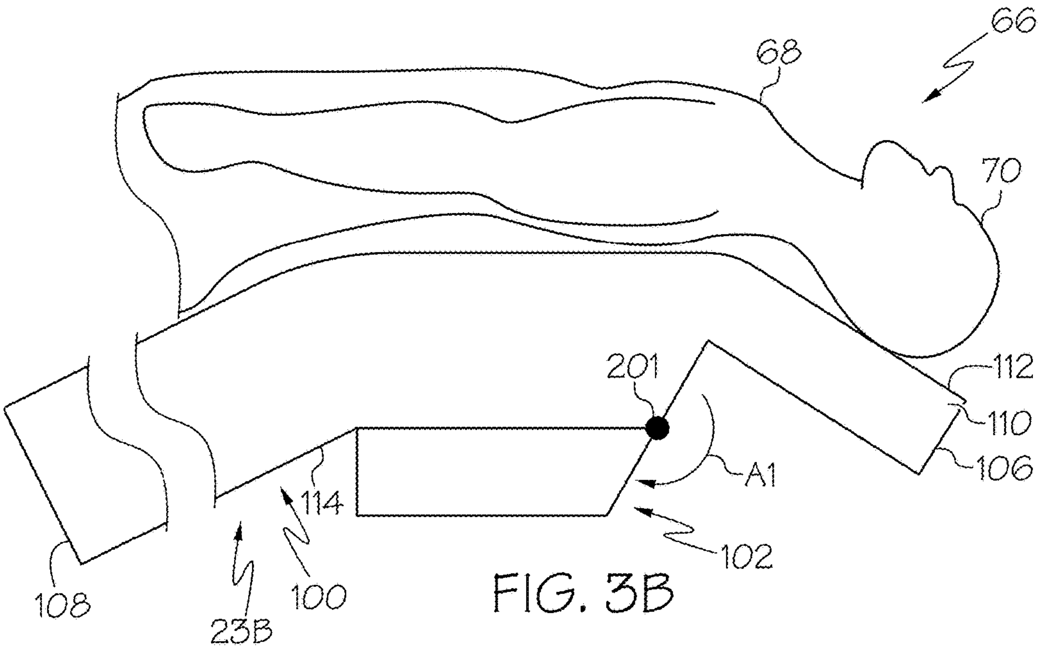
FIG. 3B schematically depicts a side view of the person support apparatus of FIG. 3A in a second position, according to one or more embodiments shown and described herein.

Referring now to FIGS. 3A and 3B, an embodiment of a person support surface 23A is depicted on which the person 66 is positioned. It should be appreciated that the person support surface 23B is similar to the person support surface 23 discussed herein and depicted in FIG. 1 and the person support surface 23A discussed herein and depicted in FIGS. 2A-2C. Therefore, similar reference numbers will be used to refer to like parts. However, the person support surface 23B includes the removable support block 102 rotatably attached to the support body 100, as discussed herein.

Specifically, as discussed herein with respect to the person support surface 23A, an attachment mechanism is included for coupling the support body 100 and the removable support block 102 to one another. As shown in FIG. 3A, the attachment mechanism is a pivot 201 rotatably attaching the removable support block 102 to the support body 100. The pivot 201 facilitates positioning the removable support block 102 from a stowed position, as shown in FIG. 3A, to a raised position, as shown in FIG. 3B, by rotating the removable support block 102 about the pivot 201 in the direction of arrow A1 out of the cavity 116 formed in the support body 100 and away from the head end 106 of the support body 100. The removable support block 102 may be returned to the stowed position from the raised position by rotating the removable support block 102 about the pivot 201 in the opposite direction.

When in the raised position, the lower surface 126 of the removable support block 102 abuts against the lower surface 114 of the support body 100. In doing so, the removable support block 102 causes the support body 100 to bend to raise the shoulders 68 of the person 66 relative to the head 70 of the person 66 situated on the person support surface 23B.

Figure 4A:
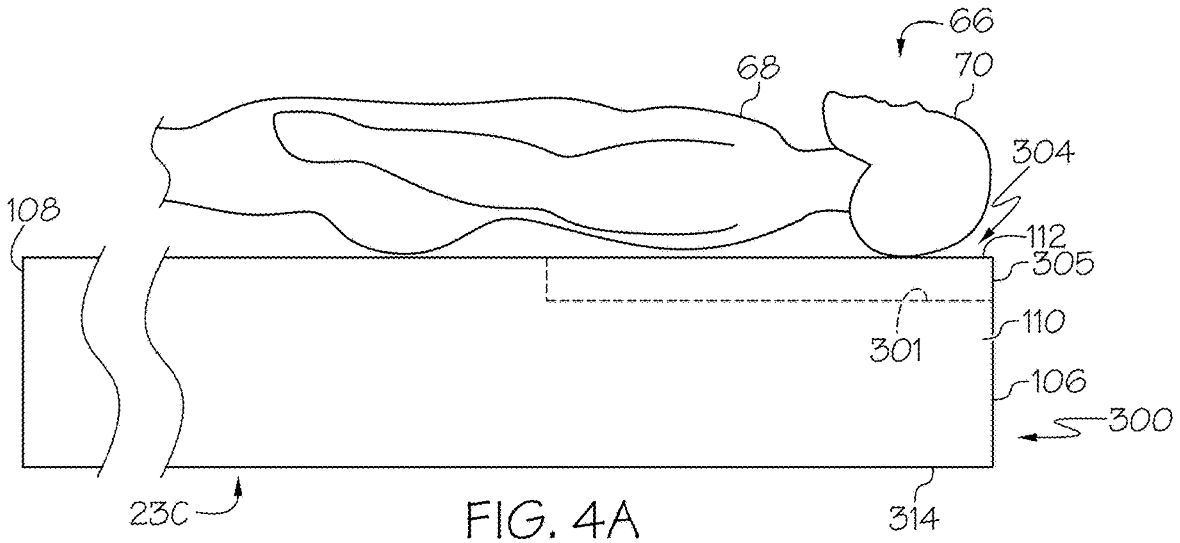
FIG. 4A schematically depicts a side view of an embodiment of a person support apparatus in a first position, according to one or more embodiments shown and described herein.
Figure 4B:
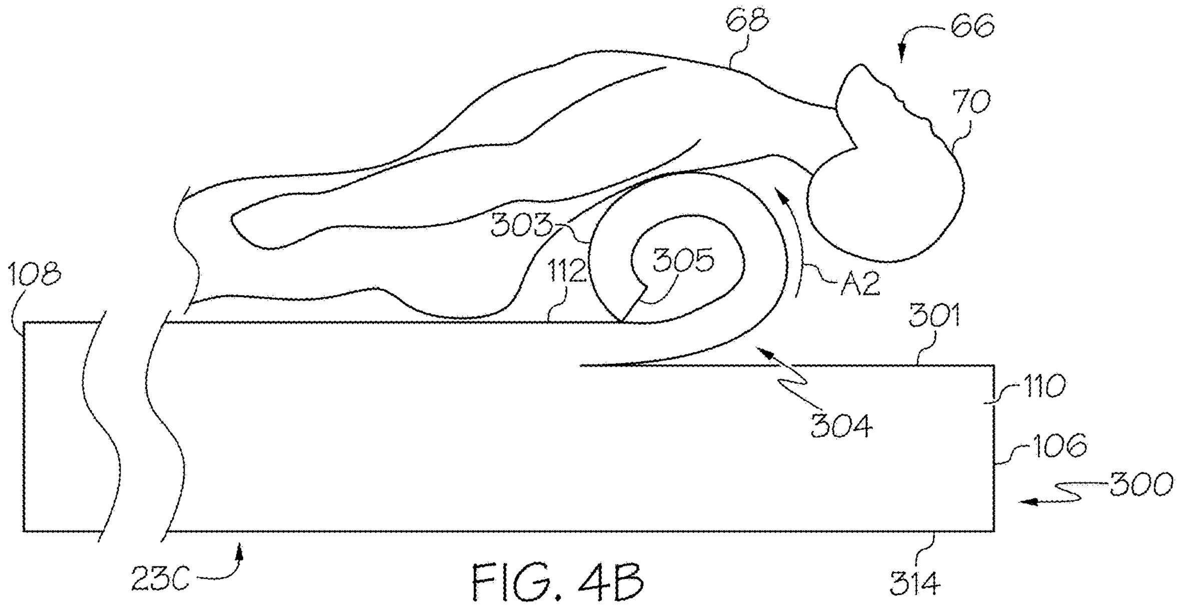
FIG. 4B schematically depicts a side view of the person support apparatus of FIG. 4A in a second position, according to one or more embodiments shown and described herein.
Figure 4C:
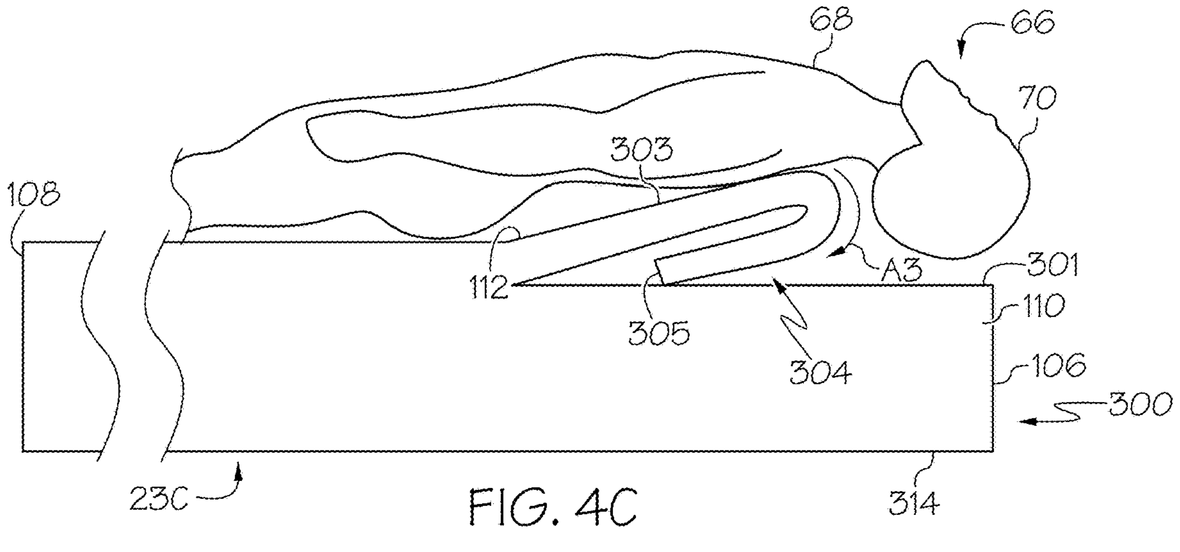
FIG. 4C schematically depicts a side view of the person support apparatus of FIG. 4A in a third position, according to one or more embodiments shown and described herein.

Referring now to FIGS. 4A-4C, another embodiment of a person support surface 23C is depicted on which the person 66 is positioned. It should be appreciated that the person support surface 23C is similar to the person support surface 23A discussed herein and depicted in FIG. 1. Therefore, similar reference numbers will be used to refer to like parts. However, the person support surface 23C does not include the cavity 116 formed in the support body 100 of the person support surface 23A. Rather, the person support surface 23C includes a support body 300 having a planar lower surface 314 extending from the head end 106 to the foot end 108 of the support body 300.

Accordingly, the person support surface 23C does not include the removable support block 102. Rather, as shown in FIG. 4A, a cut 301 is formed in the support body 300 extending from the head end 106 of the support body 300 toward the foot end 108 of the support body 300. The cut 301 extends across an entire width of the support body 300 between the sides 110 of the support body 300 to define a flap 303, as an intubation assistance device 304, including a portion of the upper surface 112 of the support body 300.

The support body 300 has a length defined between the head end 106 and the foot end 108 of the support body 300. In embodiments, the flap 303 extends equal to or greater than 10% and less than or equal to 90% of the length of the support body 300. In embodiments, the flap 303 extends equal to or greater than 10% and less than or equal to 50% of the length of the support body 300. In embodiments, the flap 303 extends equal to or greater than 10% and less than or equal to 30% of the length of the support body 300.

The cut 301 is formed closer to the upper surface 112 than the lower surface 114 of the support body 300. The support body 300 has a thickness defined between the upper surface 112 and the lower surface 114 of the support body 300. The flap 303 has a thickness defined between the upper surface 112 and the cut 301. In embodiments, the flap 303 has a thickness equal to or greater than 5% and less than or equal to 50% of the thickness of the support body 300. In embodiments, the flap 303 has a thickness equal to or greater than 5% and less than or equal to 40% of the thickness of the support body 300. In embodiments, the flap 303 has a thickness equal to or greater than 5% and less than or equal to 30% of the thickness of the support body 300. In embodiments, the flap 303 has a thickness equal to or greater than 5% and less than or equal to 20% of the thickness of the support body 300. In embodiments, the flap 303 has a thickness equal to or greater than 5% and less than or equal to 10% of the thickness of the support body 300.

The flap 303 is formed from the same flexible material forming the remaining portion of the support body 300. As such, the flap 303 may be folded, bent, rolled, or otherwise deformed to create a bulge under the shoulders 68 of the person 66 positioned on the person support surface 23C to raise the shoulders 68 of the person 66 relative to the head 70 of the person 66. For example, as shown in FIG. 4B, the flap 303 may be rolled in the direction of arrow A2 to roll the flap 303 on top of the upper surface 112 of the support body 300. Alternatively, as shown in FIG. 4C, the flap 303 may be rolled in the direction of arrow A3 opposite the direction of arrow A2. With the flap 303 rolled in the direction of arrow A3, a free end 305 of the flap 303 defining a portion of the head end 106 of the support body 300 is positioned within the cut 301 itself between the flap 303 and a remaining or lower portion of the support body 300. In any event, the flap 303 forms a bulge under the shoulders 68 of the person 66 positioned on the person support surface 23C to raise the shoulders 68 of the person 66 compared to a position of the person 66 shown in FIG. 4A in which the flap 303 does not form the bulge.

Figure 5A:
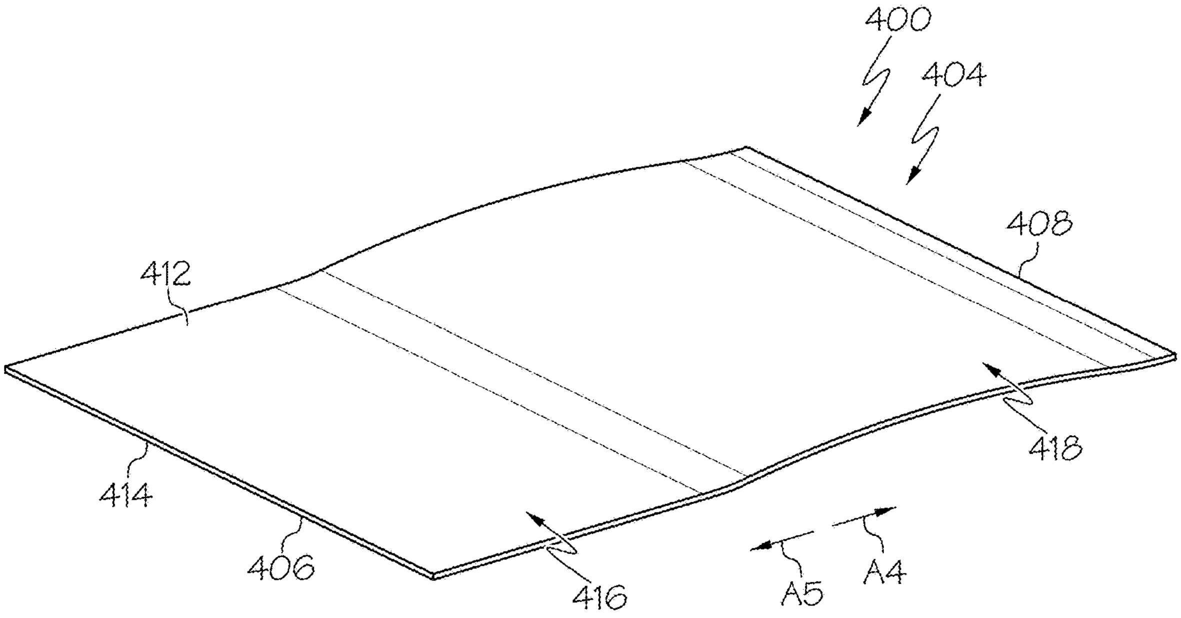
FIG. 5A schematically depicts a perspective view of an embodiment of an intubation assistance device in a lowered position, according to one or more embodiments shown and described herein.
Figure 5B:
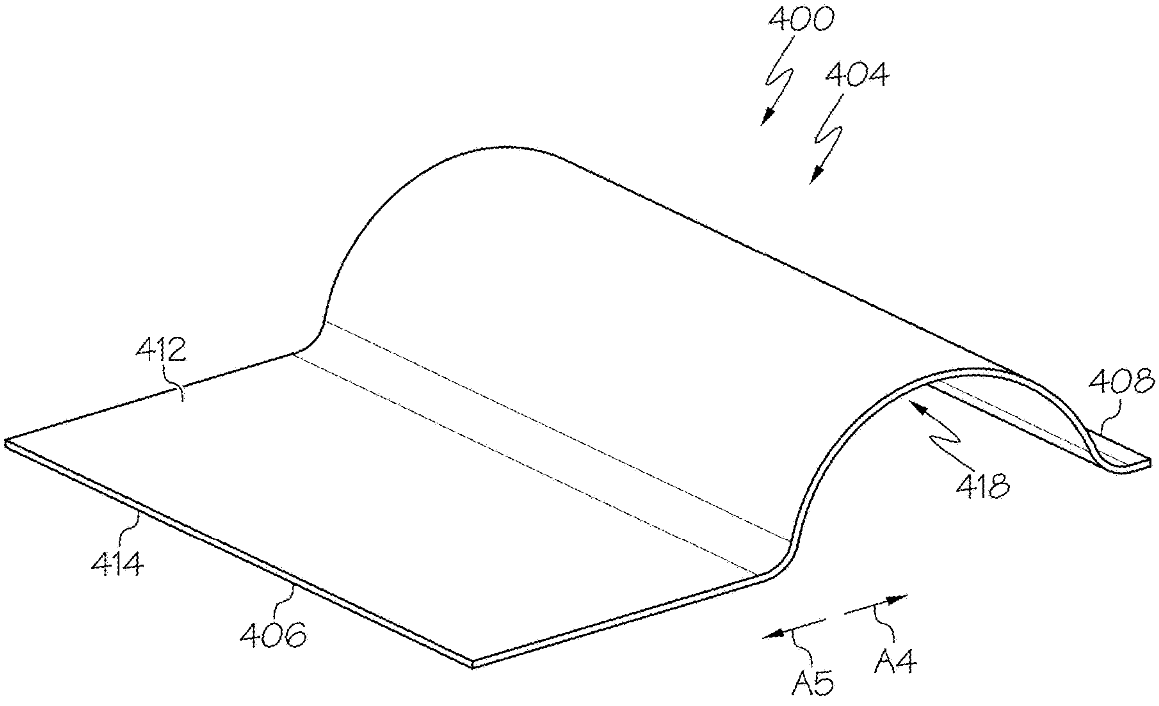
FIG. 5B schematically depicts a perspective view of the intubation assistance device of FIG. 5A in a raised state, according to one or more embodiments shown and described herein.

Referring now to FIGS. 5A and 5B, an intubation assistance device 404 is depicted as a mat 400. In embodiments, the mat 400 is positioned below the person support surface 23, such as between the person support surface 23 and the deck 22 (FIG. 1). In other embodiments, the mat 400 is positioned within the person support surface 23 itself. In other embodiments, the mat 400 may be positioned at or on an upper surface of the person support surface 23 to directly contact the shoulders of the person. The mat 400 includes a displaced end 406, a fixed end 408 opposite the displaced end 406, an upper surface 412, and a lower surface 414 opposite the upper surface 412.

The mat 400 also includes a rigid portion 416 and a flexible portion 418. The rigid portion 416 is provided at the displaced end 406, and the flexible portion 418 is provided at the fixed end 408. Despite being referred to as “rigid” or “flexible”, the rigid portion 416 and the flexible portion 418 may each be flexible to some degree. However, it should be understood that the rigid portion 416 merely has a rigidity greater than a rigidity of the flexible portion 418 such that the rigid portion 416 substantially maintains its position during movement of the displaced end 406 relative to the fixed end 408 while the flexible portion 418 does not. Accordingly, when the displaced end 406 is moved in a direction of arrow A4 toward the fixed end 408, the rigid portion 416 maintains its planar shape while a bulge is formed in the flexible portion 418 to accommodate for the decrease in distance between the displaced end 406 and the fixed end 408, as should in FIG. 5B. The mat 400 may be formed from any suitable material such as, for example, rubber, vinyl, polyethylene, polypropylene, PVC (polyvinyl chloride), silicone, leather, foam, and the like.

When in use, the fixed end 408 of the mat 400 is fixed to the person support surface 23 and/or the deck 22 (FIG. 1) in any suitable manner. For example, the fixed end 408 of the mat 400 may be fixed to the person support surface 23 and/or the deck 22 using an adhesive, sewing, ultrasonic welding, hook and loop fasteners or other fasteners, and the like. Thereafter, to create the bulge in the flexible portion 418 of the mat 400, the displaced end 406 of the mat 400 is moved toward the fixed end 408 of the mat 400, as shown in FIG. 5B. The bulge facilitates raising the shoulders of the person positioned on the person support surface 23. To lower the shoulders of the person, the displaced end 406 is then moved in the direction of arrow A5 opposite the direction of arrow A4 to increase the distance between the displaced end 406 and the fixed end 408 and remove the bulge.

Figure 6:
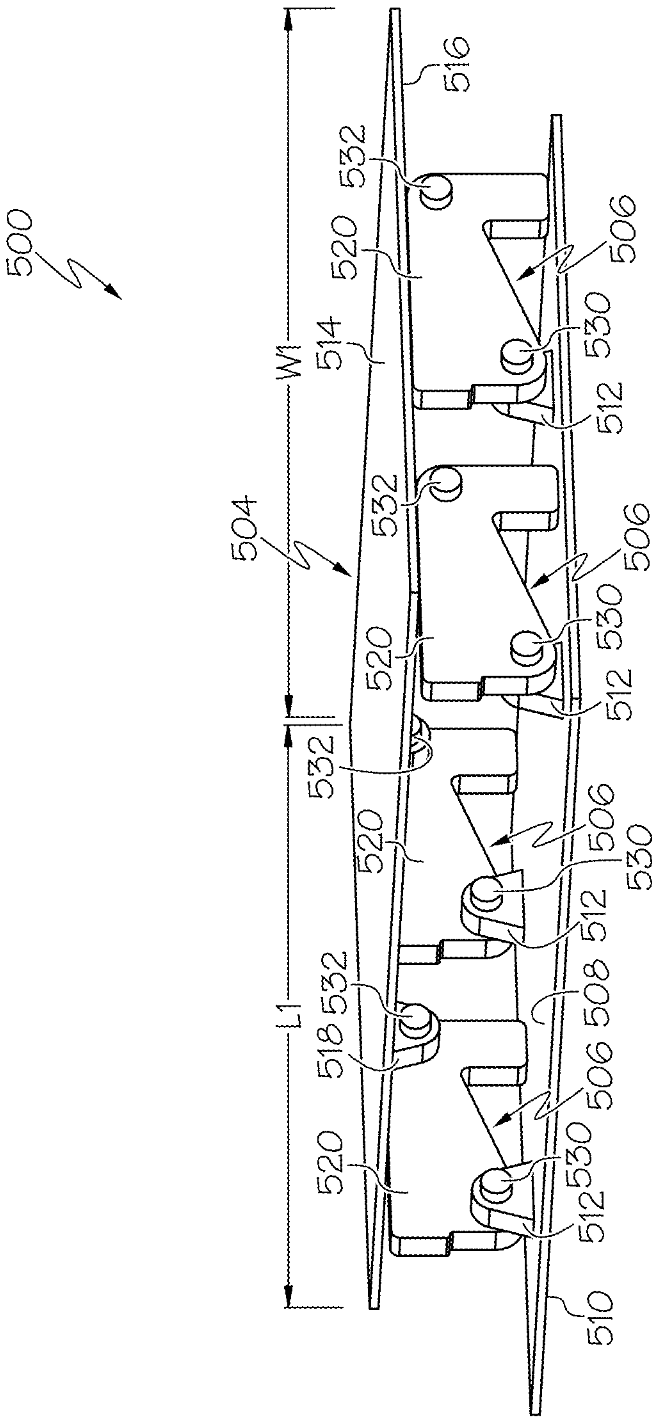
FIG. 6 schematically depicts a perspective view of an embodiment of an intubation assistance device in a lowered position, according to one or more embodiments shown and described herein.
Figure 7A:
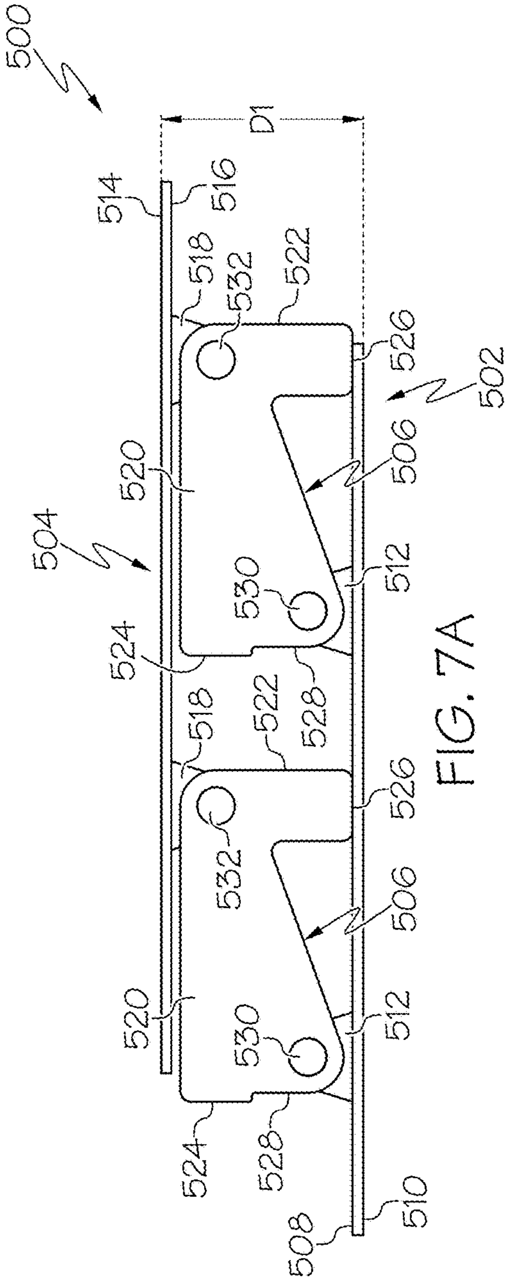
FIG. 7A schematically depicts a side view of the intubation assistance device of FIG. 6 in the lowered position, according to one or more embodiments shown and described herein.
Figure 7B:
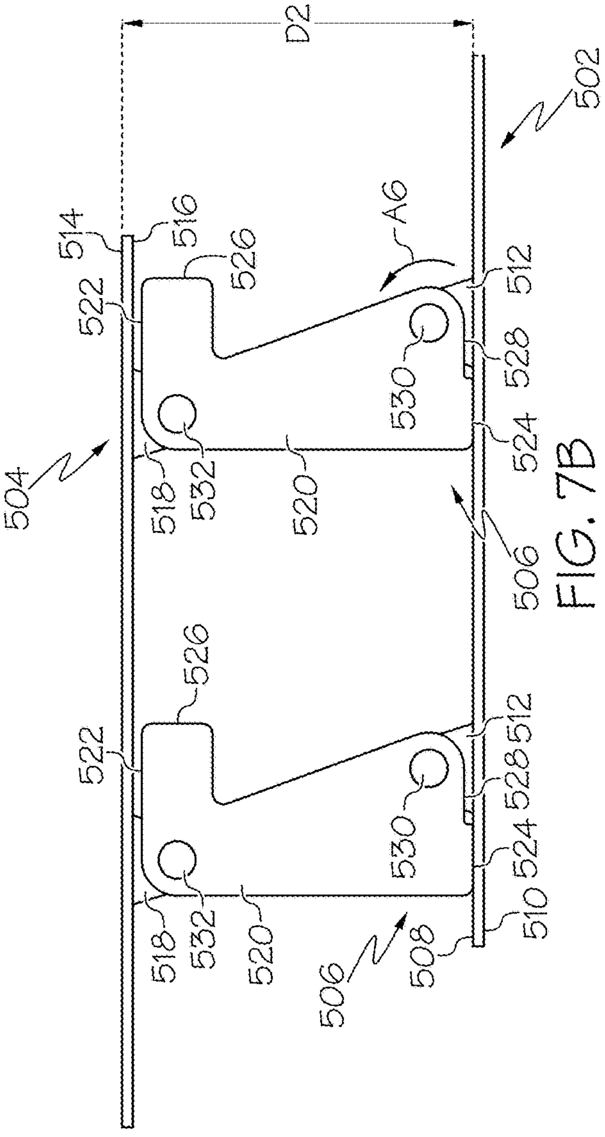
FIG. 7B schematically depicts a side view of the intubation assistance device of FIG. 6 in a raised position, according to one or more embodiments shown and described herein.

Referring now to FIGS. 6-7B, an embodiment of an intubation assistance device 500 is depicted. The intubation assistance device 500 includes a lower plate 502 and an elevated platform 504 rotatable coupled to the lower plate 502 by one or more pivot arms 506. As shown, the intubation assistance device 500 includes a plurality of pivot arms 506, and more specifically four pivot arms 506. However, it should be appreciated that the intubation assistance device 500 may include a single pivot arm 506, two pivot arms 506, three pivot arms 506, or more than four pivot arms 506 rotatably coupling the elevated platform 504 to the lower plate 502.

The lower plate 502 includes an upper surface 508 and a lower surface 510 opposite the upper surface 508. In embodiments, the lower plate 502 includes one or more lower flanges 512 corresponding to the number of pivot arms 506. The elevated platform 504 includes an upper surface 514 and a lower surface 516 opposite the upper surface 514. In embodiments, the elevated platform 504 has a length L1 suitable to extend from about the mid-shoulder region to about the mid-back or upper lumbar region of the person 66. In embodiments, the elevated platform 504 has a width W1 suitable to extend across the shoulder blades of the person 66.

In embodiments, the elevated platform 504 includes one or more upper flanges 518 corresponding to the number of pivot arms 506. Each pivot arm 506 includes a pivot arm body 520, an upper abutment surface 522, a lower abutment surface 524 formed at an opposite end of the pivot arm body 520, and a side abutment surface 526 extending perpendicular to the upper abutment surface 522 and the lower abutment surface 524. In embodiments, the lower abutment surface 524 defines a recess 528 formed in the pivot arm body 520.

It should be appreciated that the pivot arms 506 are rotatably coupled to the lower plate 502 and the elevated platform 504 in any suitable manner. For example, a lower pin 530 may extend through the lower flange 512 and the pivot arm body 520 to rotatably couple the pivot arm 506 to the lower plate 502, and an upper pin 532 may extend through the upper flange 518 and the pivot arm body 520 to rotatably couple the pivot arm 506 to the elevated platform 504. In embodiments, the lower pin 530 and the upper pin 532 may be integrally formed with the pivot arm body 520 and extend into a receiving hole formed in the lower flange 512 and the upper flange 518. In other embodiments, the lower pin 530 and the upper pin 532 may be integrally formed with the lower flange 512 and the upper flange 518 and extend into receiving holes formed in the pivot arm body 520. In other embodiments, the lower pin 530 and the upper pin 532 may be formed as a separate component from each of the lower flange 512, the upper flange 518, and the pivot arm body 520.

The intubation assistance device 500 is positionable between a stowed position, as shown in FIGS. 6 and 7A, and an raised position, as shown in FIG. 7B. It should be appreciated that the intubation assistance device 500 may be positionable between the stowed position and the raised position, as well as any number of intermediate positions, in any suitable manner. For example, the intubation assistance device 500 may include a motor and a controller for receiving instruction from an electronic device, such as an electronic control unit, human machine interface, mobile device, or the like, communicatively coupled to the motor for operating the motor in response to signals received at the electronic device. In other embodiments, the intubation assistance device 500 may be manually positionable between the stowed position and the raised position.

Referring now to FIG. 7A, the intubation assistance device 500 is shown in the lowered position. In the lowered position, the pivot arms 506 are rotated such that the side abutment surface 526 contacts the upper surface 508 of the lower plate 502. In the lowered position, the elevated platform 504 is spaced apart from the lower plate 502 by a first distance D1.

Referring now to FIG. 7B, the intubation assistance device 500 is shown in the raised position. In the raised position, the pivot arms 506 are rotated in the direction of arrow A6 from the position of the pivot arms 506 shown in FIG. 7A until the lower abutment surface 524 contacts the upper surface 508 of the lower plate 502. Specifically, the pivot arms 506 rotate about pivot points defined by the lower flange 512 and the upper flange 518. In the raised position, the elevated platform 504 is spaced apart from the lower plate 502 by a second distance D2 greater than the first distance D1.

In embodiments, the intubation assistance device 500 is positioned below the person support surface 23, such as between the person support surface 23 and the deck 22 (FIG. 1). In other embodiments, the intubation assistance device 500 is positioned within the person support surface 23 itself. In other embodiments, the intubation assistance device 500 may be positioned at or on an upper surface of the person support surface 23 to directly contact the shoulders of the person. In use, the intubation assistance device 500 is initially positioned in the stowed position to permit the person positioned on the person support surface 23 to be in a planar supine position. When it is desired to raise the shoulders of the person so that an intubation procedure may be performed, the intubation assistance device 500 is positioned into the raised position so as to raise the portion of the person support surface 23 on which the shoulders of the person are positioned. Thus, the shoulders are raised relative to the head of the person by the elevated platform 504 while the head of the person is permitted to be lowered.

Figure 8:
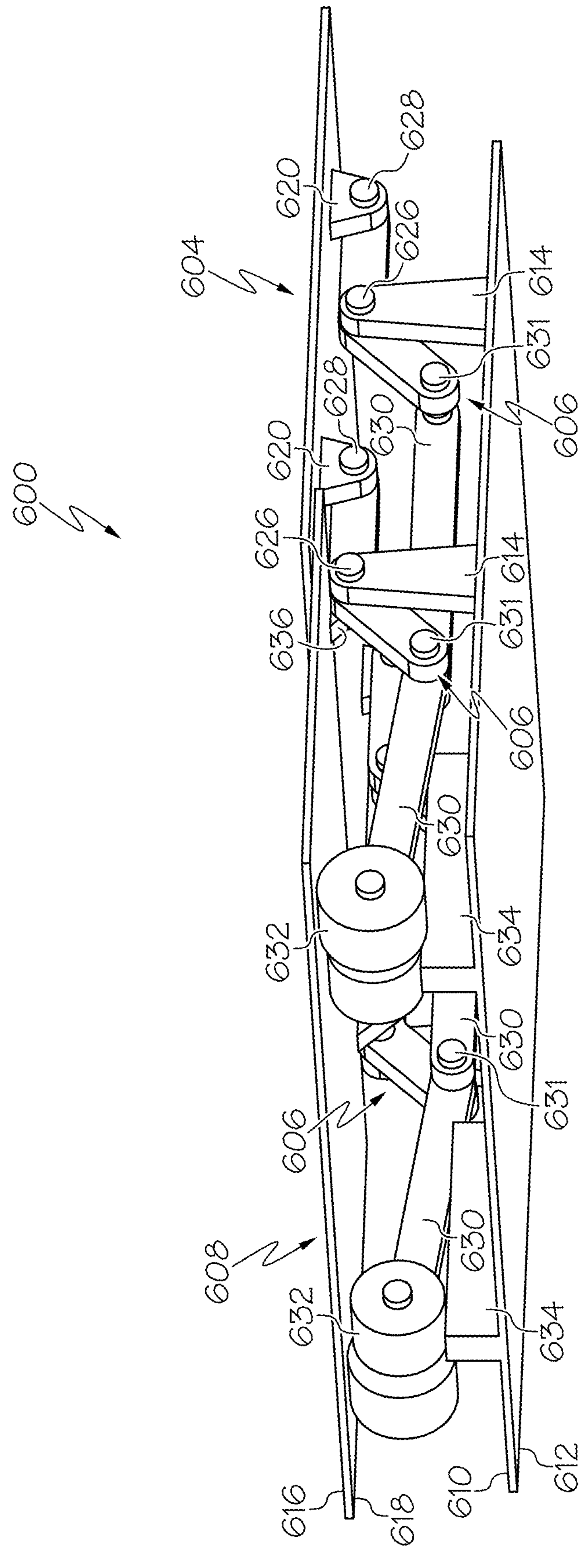
FIG. 8 schematically depicts a perspective view of an embodiment of an intubation assistance device in a lowered position, according to one or more embodiments shown and described herein.
Figure 9A:
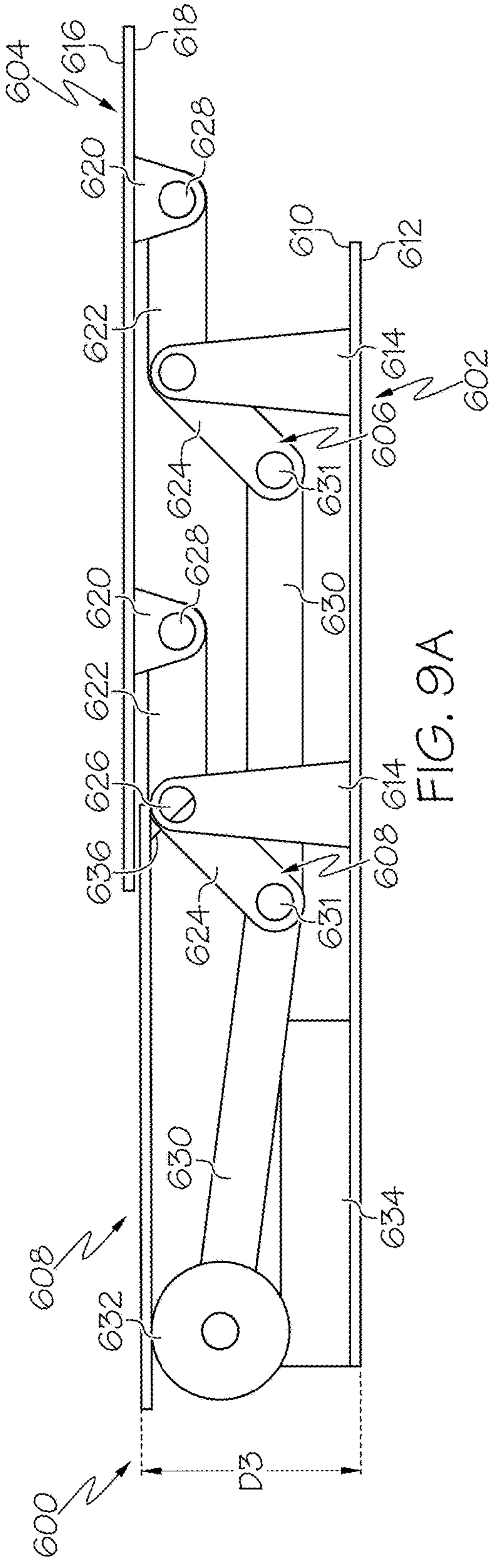
FIG. 9A schematically depicts a side view of the intubation assistance device of FIG. 8 in the lowered position, according to one or more embodiments shown and described herein.
Figure 9B:
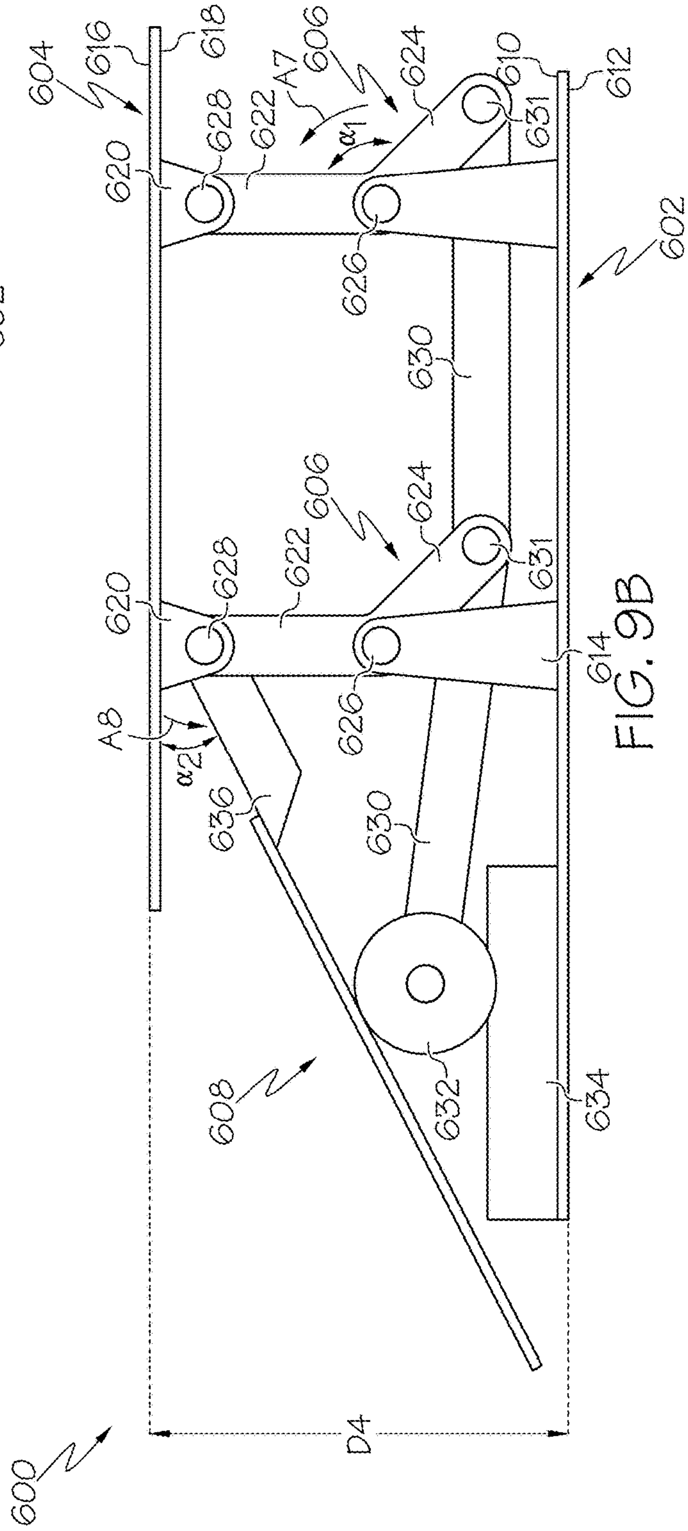
FIG. 9B schematically depicts a side view of the intubation assistance device of FIG. 8 in a raised position, according to one or more embodiments shown and described herein.

Referring now to FIGS. 8 and 9A-9B, an embodiment of an intubation assistance device 600 is depicted. The intubation assistance device 600 includes a lower plate 602, an elevated platform 604 rotatable coupled to the lower plate 602 by one or more pivot arms 606, and a pivot plate 608 pivotally coupled to the elevated platform 604. As shown in FIG. 8, the intubation assistance device 600 includes a plurality of pivot arms 606, and more specifically four pivot arms 606. However, it should be appreciated that the intubation assistance device 600 may include a single pivot arm 606, two pivot arms 606, three pivot arms 606, or more than four pivot arms 606 rotatably coupling the elevated platform 604 to the lower plate 602. The elevated platform 604 may have similar dimensions to the elevated platform 504 (FIG. 6) discussed herein. Specifically, the elevated platform 604 may have a length suitable to extend from about the mid-shoulder region to about the mid-back or upper lumbar region of the person 66, and a width suitable to extend across the shoulder blades of the person 66.

The lower plate 602 includes an upper surface 610 and a lower surface 612 opposite the upper surface 610. In embodiments, the lower plate 602 includes one or more lower flanges 614 corresponding to the number of pivot arms 606. The elevated platform 604 includes an upper surface 616 and a lower surface 618 opposite the upper surface 616. In embodiments, the elevated platform 604 includes one or more upper flanges 620 corresponding to the number of pivot arms 606.

Each pivot arm 606 includes a first pivot arm portion 622 and a second pivot arm portion 624 extending from an end of the first pivot arm portion 622. As best shown in FIG. 9B, the second pivot arm portion 624 extends from the first pivot arm portion 622 at a particular pivot arm angle. In embodiments, the second pivot arm portion 624 extends from the first pivot arm portion 622 at a pivot arm angle $\alpha 1$ greater than 90 degrees and less than 180 degrees. In embodiments, the pivot arm angle $\alpha 1$ is greater than 120 degrees and less than 150 degrees. In embodiments, the pivot arm angle $\alpha 1$ is greater than 130 degrees and less than 140 degrees. In embodiments, the pivot arm angle $\alpha 1$ is 135 degrees+/−5%. In embodiments, the pivot arm angle $\alpha 1$ is 135 degrees+/−10%. In embodiments, the pivot arm angle $\alpha 1$ is 135 degrees+/−15%. In embodiments, the pivot arm angle $\alpha 1$ is 135 degrees+/−20%.

It should be appreciated that the pivot arms 606 are rotatably coupled to the lower plate 602 and the elevated platform 604 in any suitable manner. For example, a lower pin 626 may extend through the lower flange 614 and the pivot arm 606 to rotatably couple the pivot arm 606 to the lower plate 602, and an upper pin 628 may extend through the upper flange 620 and the pivot arm 606 to rotatably couple the pivot arm 606 to the elevated platform 604. In embodiments, the lower pin 626 and the upper pin 628 may be integrally formed with the pivot arm 606 and extend into a receiving hole formed in the lower flange 614 and the upper flange 620. In other embodiments, the lower pin 626 and the upper pin 628 may be integrally formed with the lower flange 614 and the upper flange 620 and extend into receiving holes formed in the pivot arm 606. In other embodiments, the lower pin 626 and the upper pin 628 may be formed as a separate component from each of the lower flange 614, the upper flange 620, and the pivot arm 606.

Referring again to FIG. 8, in embodiments, the intubation assistance device 600 includes one or more linkage arms 630. As shown, the intubation assistance device 600 includes a first pair of linkage arms 630 interconnecting adjacent pairs of pivot arms 606, and a second pair of linkage arms 630 extending to a pair of rollers 632. It should be appreciated that the number of linkage arms 630 corresponds to the number of pivot arms 606. Accordingly, in embodiments in which the intubation assistance device 600 includes only a single pivot arm 606, the intubation assistance device 600 may include only a single linkage arm 630.

The linkage arms 630 extending between adjacent pivot arms 606 are rotatably coupled to the pivot arms 606 at opposite ends of the linkage arms 630 and, more specifically, to an end of the second pivot arm portion 624 opposite the first pivot arm portion 622, via a linkage pin 631. The linkage arms 630 extending between the pivot arms 606 and the rollers 632 are rotatably coupled to the pivot arms 606 and, more specifically, to an end of the second pivot arm portion 624 opposite the first pivot arm portion 622, at an end of the linkage arms 630. The linkage arms 630 are also rotatably coupled to the rollers 632 at an opposite end of the linkage arms 630.

In embodiments, as shown in FIG. 8, the intubation assistance device 600 includes a pair of rollers 632 with each roller 632 corresponding to a pair of pivot arms 606 and a pair of linkage arms 630. However, it should be appreciated that the intubation assistance device 600 may include any number of rollers 632 such as, for example, one roller 632 or more than two rollers 632. Additionally, in embodiments, the intubation assistance device 600 includes a pair of tracks 634 provided on the upper surface 610 of the lower plate 602 with each track 634 associated with a respective roller 632. The track 634 facilitates guiding the roller 632 as the intubation assistance device 600 moves between a stowed position and a raised position, as discussed in more detail herein. However, it should be appreciated that the intubation assistance device 600 may include any number of tracks 634 corresponding to the number of rollers 632 such as, for example, one track 634 or more than two tracks 634. In other embodiments, the intubation assistance device 600 may not include any tracks 634 provided on the upper surface 610 of the lower plate 602. Rather, the rollers 632 may engage the lower plate 602 directly.

Referring still to FIG. 8, as described herein, the intubation assistance device 600 may include the pivot plate 608 and one or more pivot plate supports 636 rotatably coupling the pivot plate 608 to the elevated platform 604. As shown, the intubation assistance device 600 includes a pair of pivot plate supports 636 rotatably attached to the upper flange 620 and fixed to the pivot plate 608. It should be appreciated that the pivot plate supports 636 are rotatably coupled to the elevated platform 604 in any suitable manner such as, for example, via the upper pin 628.

The pivot plate supports 636 may be fixed to the pivot plate 608 in any suitable manner such as, for example, using threaded or non-threaded fasteners, using an adhesive, welding, or the like. The pivot plate 608 is supported on the rollers 632. In embodiments, the intubation assistance device 600 may include a single pivot plate support 636 rotatably coupled to the elevated platform 604. However, utilizing a pair of pivot plate supports 636 provides improved support and stabilization to the pivot plate 608 during operation.

The intubation assistance device 600 is positionable between a stowed position, as shown in FIGS. 8 and 9A, and an raised position, as shown in FIG. 9B. It should be appreciated that the intubation assistance device 600 may be positionable between the stowed position and the raised position, as well as any number of intermediate positions, in any suitable manner. For example, the intubation assistance device 600 may include a motor and a controller for receiving instruction from an electronic device, such as an electronic control unit, human machine interface, mobile device, or the like, communicatively coupled to the motor for operating the motor in response to signals received at the electronic device. In other embodiments, the intubation assistance device 600 may be manually positionable between the stowed position and the raised position.

Referring now to FIG. 9A, the intubation assistance device 600 is shown in the lowered position. In the lowered position, the pivot arms 606 are rotated such that the elevated platform 604 is spaced apart from the lower plate 602 by a first distance D3. Additionally, in the lowered position, the rollers 632 are located at an end of the tracks 634 opposite the lower flanges 614, and the pivot plate 608, which is supported by the rollers 632 and the pivot plate supports 636, is oriented substantially parallel to the elevated platform 604.

Referring now to FIG. 9B, the intubation assistance device 600 is shown in the raised position. In the raised position, the pivot arms 606 are rotated in the direction of arrow A7 from the position of the pivot arms 606 shown in FIG. 9A. Specifically, the pivot arms 606 rotate about pivot points defined by the lower flange 614 and the upper flange 620. In the raised position, the elevated platform 604 is spaced apart from the lower plate 602 by a second distance D4 greater than the first distance D3. In embodiments, the second distance D4 is greater than or equal to 50 millimeters (mm) and less than or equal to 200 mm. In embodiments, the second distance D4 is greater than or equal to 50 mm and less than or equal to 150 mm. In embodiments, the second distance D4 is 100 mm+/−10%. In embodiments, the second distance D4 is 100 mm+/−20%. In embodiments, the second distance D4 is 100 mm+/−30%. Additionally, in the raised position, the rollers 632 are located at an opposite end of the tracks 634 closest to the lower flanges 614, and the pivot plate 608, which is supported by the rollers 632 and the pivot plate supports 636, is oriented at an angle relative to the elevated platform 604.

As described herein, the pivot plate 608 is permitted to rotate relative to the elevated platform 604 due to the rotation of the pivot plate supports 636 rotatably coupled to the elevated platform 604. Accordingly, as the roller 632 moves toward the opposite end of the tracks 634 and the elevated platform 604 moves away from the lower plate 602, the pivot plate supports 636 rotate in the direction of arrow A8 to permit the pivot plate 608 to rotate relative to the elevated platform 604. In the raised position, the pivot plate 608 is oriented relative to the elevated platform 604 at a particular pivot plate angle. In embodiments, the pivot plate 608 is oriented relative to the elevated platform 604 at a pivot plate angle 2 greater than 0 degrees and less than 90 degrees. In embodiments, the pivot plate angle $\alpha$2 is greater than 30 degrees and less than 70 degrees. In embodiments, the pivot plate angle $\alpha$2 is greater than 40 degrees and less than 50 degrees. In embodiments, the pivot plate angle $\alpha$2 is 45 degrees+/−5%. In embodiments, the pivot plate angle $\alpha$2 is 45 degrees+/−10%. In embodiments, the pivot plate angle $\alpha$2 is 45 degrees+/−15%. In embodiments, the pivot plate angle $\alpha$2 is 45 degrees+/−20%.

In embodiments, the intubation assistance device 600 is positioned below the person support surface 23, such as between the person support surface 23 and the deck 22 (FIG. 1). In other embodiments, the intubation assistance device 600 is positioned within the person support surface 23 itself. In other embodiments, the intubation assistance device 600 may be positioned at or on an upper surface of the person support surface 23 to directly contact the shoulders of the person. In use, the intubation assistance device 600 is initially positioned in the stowed position to permit the person positioned on the person support surface 23 to be in a planar supine position. When it is desired to raise the shoulders of the person so that an intubation procedure may be performed, the intubation assistance device 600 is positioned into the raised position so as to raise the portion of the person support surface 23 on which the shoulders of the person are positioned. Thus, the shoulders are raised relative to the head of the person by the elevated platform 604 while the head of the person is permitted to be lowered onto the pivot plate 608. It should be appreciated that, although not depicted, the embodiment of the intubation assistance device 500 illustrated in FIGS. 6 and 7A-7B may include the pivot plate 608 for supporting the head of the person on the person support surface 23.

Figure 10:
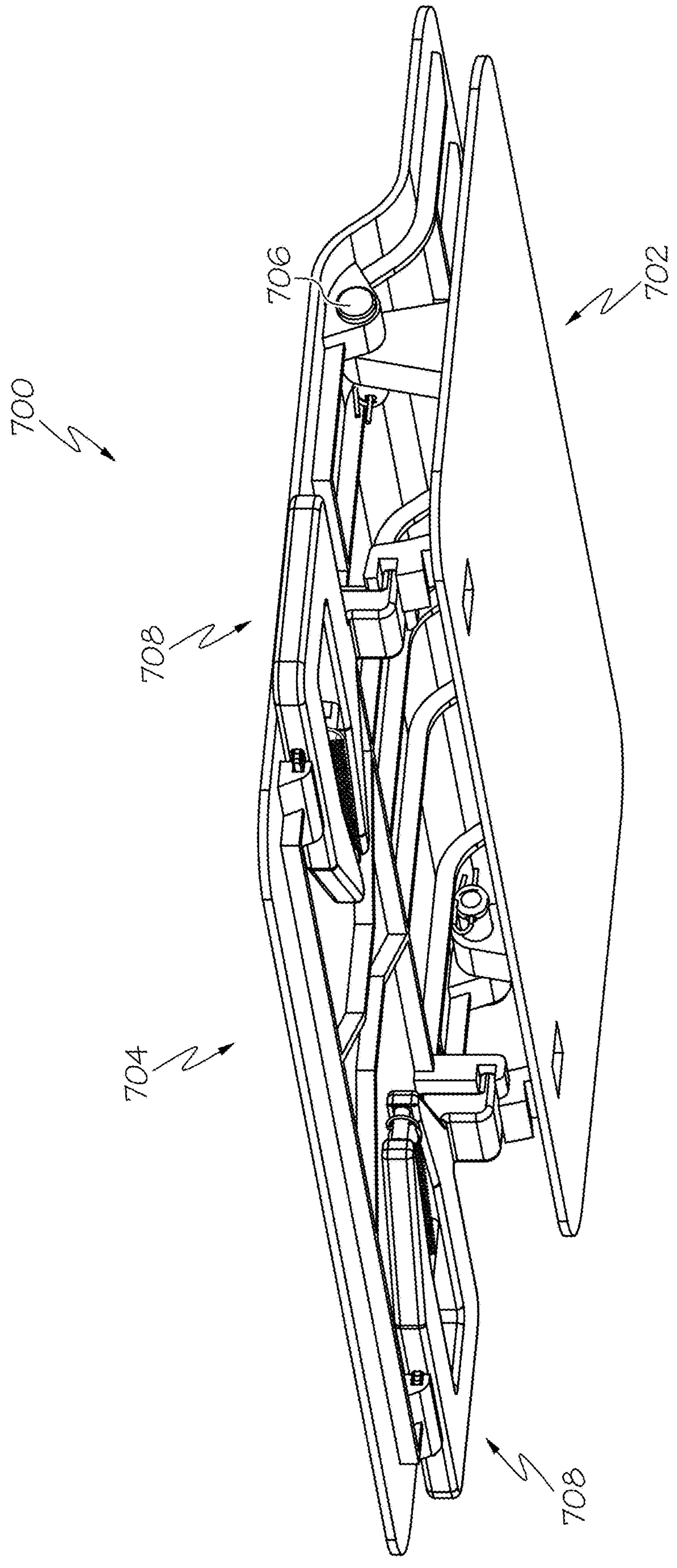
FIG. 10 schematically depicts a perspective view of an embodiment of an intubation assistance device in a neutral position, according to one or more embodiments shown and described herein.

Referring now to FIGS. 10-13, 14A, 15B, 15A, 15B, and 15C, an embodiment of an intubation assistance device 700 is depicted. Referring to FIG. 10, the intubation assistance device 700 generally includes a lower plate 702, a pivot plate 704 rotatably coupled to the lower plate 702 via one or more pins 706, and one or more handles 708 for permitting and restricting movement of the pivot plate 704 relative to the lower plate 702. As described in more detail herein, in embodiments, the intubation assistance device 700 includes a pair of handles 708. However, it should be appreciated that the intubation assistance device 700 may include one handle 708 and, in some embodiments, more than two handles 708.

Figure 11:
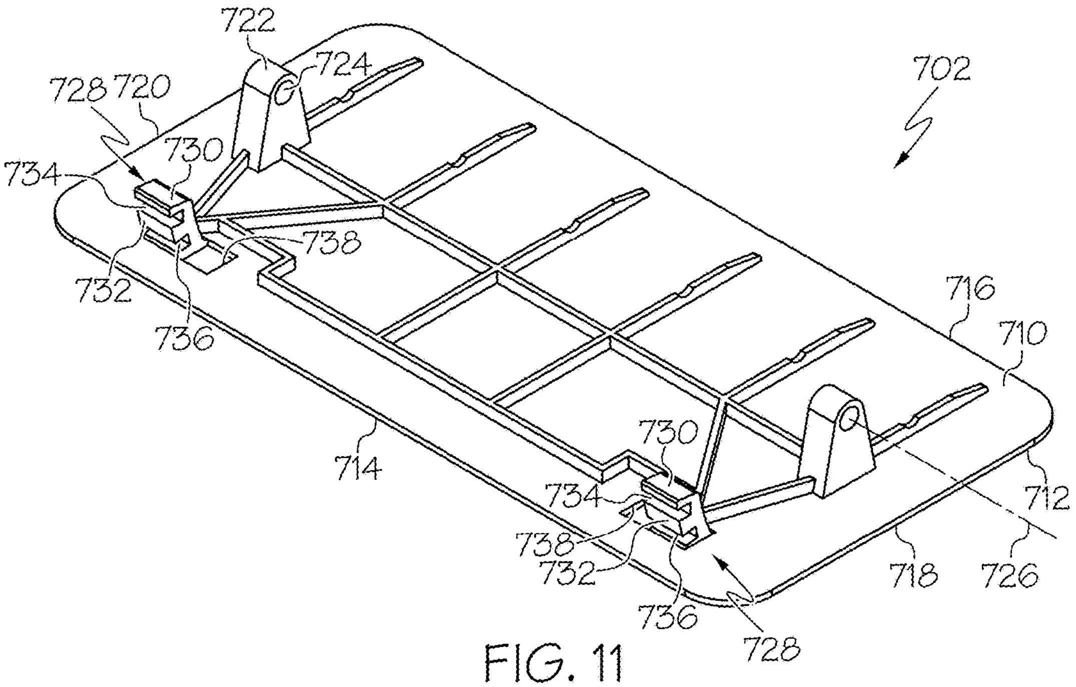
FIG. 11 schematically depicts a perspective view of a lower plate of the intubation assistance device of FIG. 10, according to one or more embodiments shown and described herein.

Referring now to FIG. 11, a top perspective view of the lower plate 702 is shown. The lower plate 702 has an upper surface 710 and a lower surface 712 opposite the upper surface 710. The lower plate 702 further includes a first end 714, a second end 716 opposite the first end 714, a first side edge 718, and a second side edge 720 opposite the first side edge 718. The first side edge 718 and the second side edge 720 extend between the first end 714 and the second end 716.

In embodiments, the lower plate 702 includes one or more lower flanges 722 provided on the upper surface 710 of the lower plate 702. As shown in FIG. 11, the lower plate 702 includes a pair of lower flanges 722 spaced apart from one another and proximate a respective one of the first side edge 718 and the second side edge 720. However, the lower plate 702 may include any number of lower flanges 722 such as, for example, one lower flange 722 or more than two lower flanges 722. Each lower flange 722 includes a lower receiving hole 724 formed therein. Accordingly, the lower receiving hole 724 of each lower flange are coaxial with one another to define a pivot axis 726 extending along a width of the lower plate 702 between the first side edge 718 and the second side edge 720. As described herein, the pivot axis 726 defines an axis about which the pivot plate 704 rotates relative to the lower plate 702.

In embodiments, the lower plate 702 includes one or more latch retainers 728 provided on the upper surface 710 of the lower plate 702. As shown in FIG. 11, the lower plate 702 includes a pair of latch retainers 728 spaced apart from one another and proximate a respective one of the first side edge 718 and the second side edge 720. However, the lower plate 702 may include any number of latch retainers 728 such as, for example, one latch retainer 728 or more than two latch retainers 728. It should be appreciated that the number of latch retainers 728 utilized corresponds to the number of handles 708 provided. Each latch retainer 728 includes an upper surface 730 and an outer surface 732 extending between the upper surface 730 of the latch retainer 728 and the upper surface 730 of the lower plate 702. One or more retainer grooves 734 are formed in the outer surface of the latch retainer 728. As shown, the latch retainer 728 includes an upper retainer groove 734 and a lower retainer groove 736 formed within the outer surface 732 of the latch retainer 728. The lower retainer groove 736 is provided between the upper retainer groove 734 and the upper surface 710 of the lower plate 702. As described herein, a portion of the handle 708 is selectively received within the upper retainer groove 734 or the lower retainer groove 736 to fix a position of the pivot plate 704 relative to the lower plate 702. In embodiments, one or more clearance openings 738 are formed in the lower plate 702 extending at least partially through the upper surface 710 and the lower surface 712 of the lower plate 702 to inhibit contact between the pivot plate 704 and the lower plate 702 during operation, as described in more detail herein.

Figure 12:
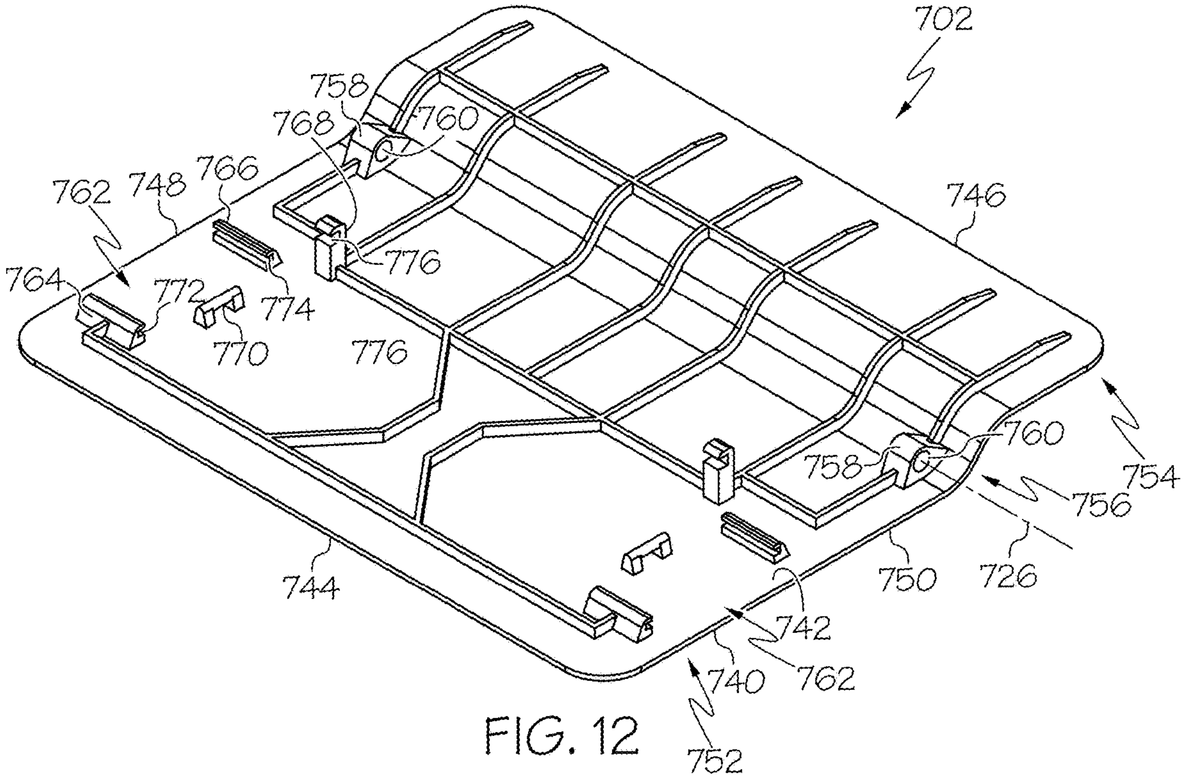
FIG. 12 schematically depicts a perspective view of a pivot plate of the intubation assistance device of FIG. 10, according to one or more embodiments shown and described herein.

Referring now to FIG. 12, a bottom perspective view of the pivot plate 704 is shown. The pivot plate 704 has an upper surface 740 and a lower surface 742 opposite the upper surface 740. The pivot plate 704 further includes a first end 744, a second end 746 opposite the first end 744, a first side edge 748, and a second side edge 750 opposite the first side edge 748. The first side edge 748 and the second side edge 750 extend between the first end 744 and the second end 746. The pivot plate 704 includes a head portion 752, a shoulder portion 754 located at a different plane than the head portion 752, and a transition portion 756 extending between the head portion 752 and the shoulder portion 754. The transition portion 756 is curved to provide a smooth transition between the head portion 752 and the shoulder portion 754.

In embodiments, the pivot plate 704 includes one or more upper flanges 758 provided on the lower surface 742 of the pivot plate 704. As shown in FIG. 12, the pivot plate 704 includes a pair of upper flanges 758 spaced apart from one another and proximate a respective one of the first side edge 748 and the second side edge 750. Particularly, the pair of upper flanges 758 are provided at an intersection of the head portion 752 and the transition portion 756. However, the pivot plate 704 may include any number of upper flanges 758 such as, for example, one upper flange 758 or more than two upper flanges 758. Additionally, the upper flanges 758 may be provided at any suitable location of the pivot plate 704 such as, for example, on the head portion 752 and spaced apart from the transition portion 756. Each upper flange 758 includes an upper receiving hole 760 formed therein. Accordingly, the upper receiving hole 760 of each upper flange 758 are coaxial with one another and further defines the pivot axis 726 when the pivot plate 704 is coupled to the lower plate 702, as described in more detail herein.

The pivot plate 704 includes one or more handle receiving areas 762 formed on the lower surface 742 of the pivot plate 704. The number of handle receiving areas 762 corresponds to the number of handles 708 provided. As shown in FIG. 12, the pivot plate 704 includes a pair of handle receiving areas 762. In embodiments, each handle receiving area 762 includes a first handle catch 764, a second handle catch 766, a latch catch 768, and a spring receiving member 770. The first handle catch 764 has a first handle catch groove 772 formed therein, the second handle catch 766 has a second handle catch groove 774 formed therein, and the latch catch 768 has a latch catch groove 776 formed therein. The first handle catch 764 is located closer to the first end 744 than the second handle catch 766, and the second handle catch 766 is located closer to the second end 746 than the first handle catch 764. The latch catch 768 is located at a side of the second handle catch 766 opposite the first handle catch 764. The latch catch 768 has a length extending in a direction from the lower surface 742 of the pivot plate 704 greater than a length of the first handle catch 764 and the second handle catch 766. In embodiments, the spring receiving member 770 is provided between the first handle catch 764 and the second handle catch 766.

Figure 13:
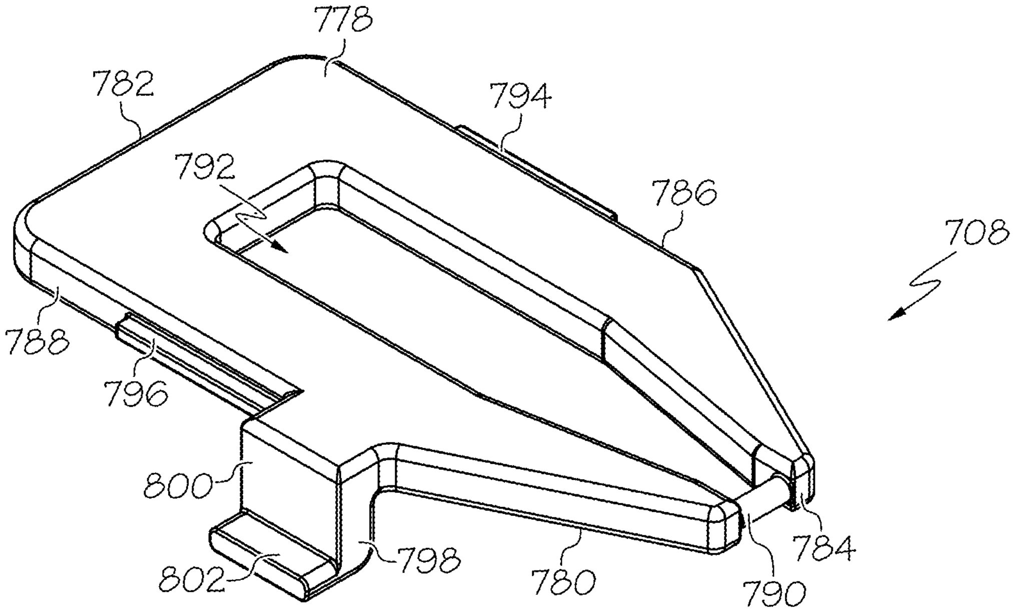
FIG. 13 schematically depicts a perspective view of a handle of the intubation assistance device of FIG. 10, according to one or more embodiments shown and described herein.

Referring now to FIG. 13, a perspective view of the handle 708 is depicted. It should be appreciated that in embodiments in which the intubation assistance device 700 includes a pair of handles 708, the handles 708 may be identical mirror images of one another. Accordingly, each handle 708 includes the same structure. Therefore, only the structure of one of the handles 708 is described in detail herein. The handle 708 includes an upper surface 778 and a lower surface 780 opposite the upper surface 778. The handle 708 includes an outer end 782, an inner end 784 opposite the outer end 782, a first edge 786, and a second edge 788 opposite the first edge 786. The first edge 786 and the second edge 788 extend between the outer end 782 and the inner end 784. In embodiments, the inner end 784 defines a reduced diameter portion 790 extending between the first edge 786 and the second edge 788. In embodiments, a cutout 792 is formed in the handle 708. As shown, the cutout 792 extends entirely through the upper surface 778 and the lower surface 780 of the handle 708. However, in embodiments, the cutout 792 may extend only partially through the handle 708.

In embodiments, the handle 708 includes a first protrusion 794 provided on and extending at least partially along the first edge 786 in a direction opposite the cutout 792, and a second protrusion 796 provided on and extending at least partially along the second edge 788 and in a direction opposite the cutout 792. As shown, the first edge 786 and the second edge 788 of the handle 708 taper toward one another in a direction toward the inner end 784 of the handle 708. However, the handle 708 may have any suitable shape not depicted herein.

The handle 708 includes a latch 798 extending from the first edge 786 of the handle 708. In embodiments, the latch 798 has an upstanding wall 800 extending from the first edge 786 of the handle 708, and a lateral wall 802 extending from an end of the upstanding wall 800 in a direction opposite the first edge 786. However, the latch 798 may have any suitable shape and may extend from any suitable location of the handle 708 such as, for example, from the lower surface 780 of the handle 708.

Figure 14A:
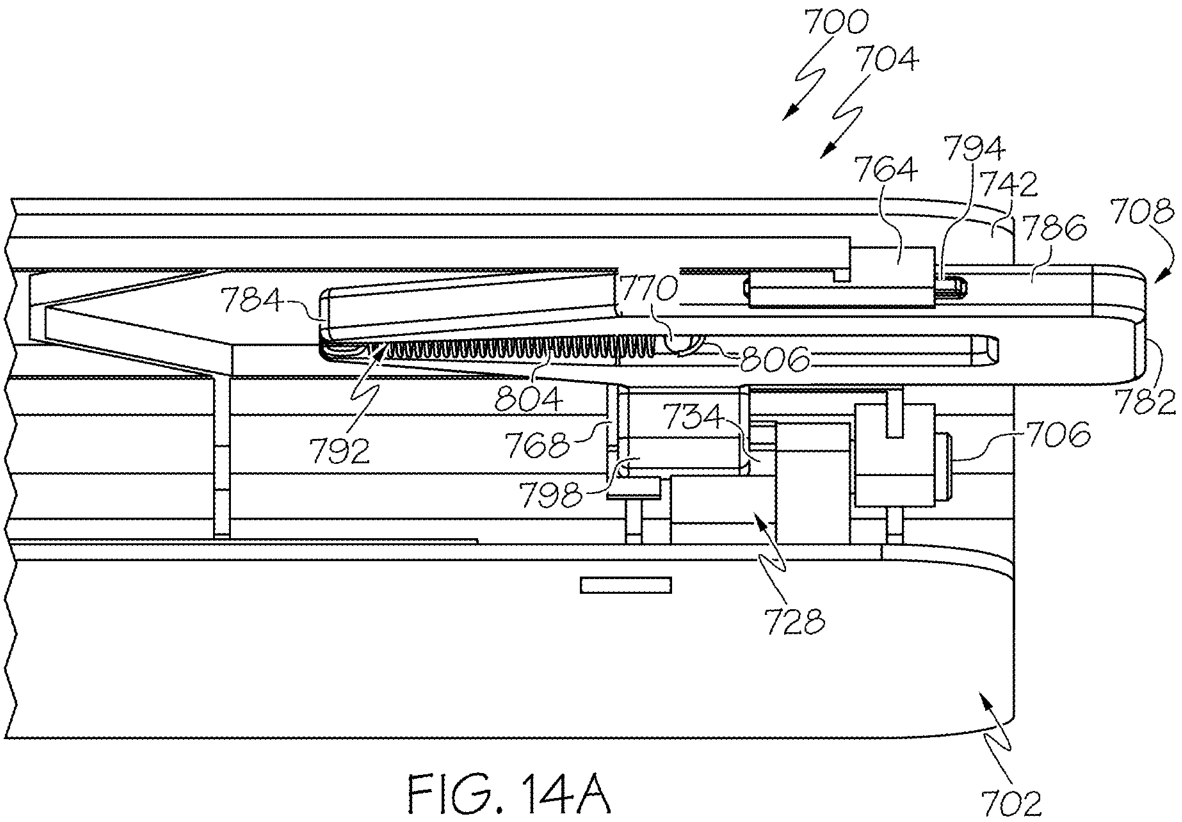
FIG. 14A schematically depicts a partial end view of the intubation assistance device of FIG. 10 with the handle in a biased position, according to one or more embodiments shown and described herein.
Figure 14B:
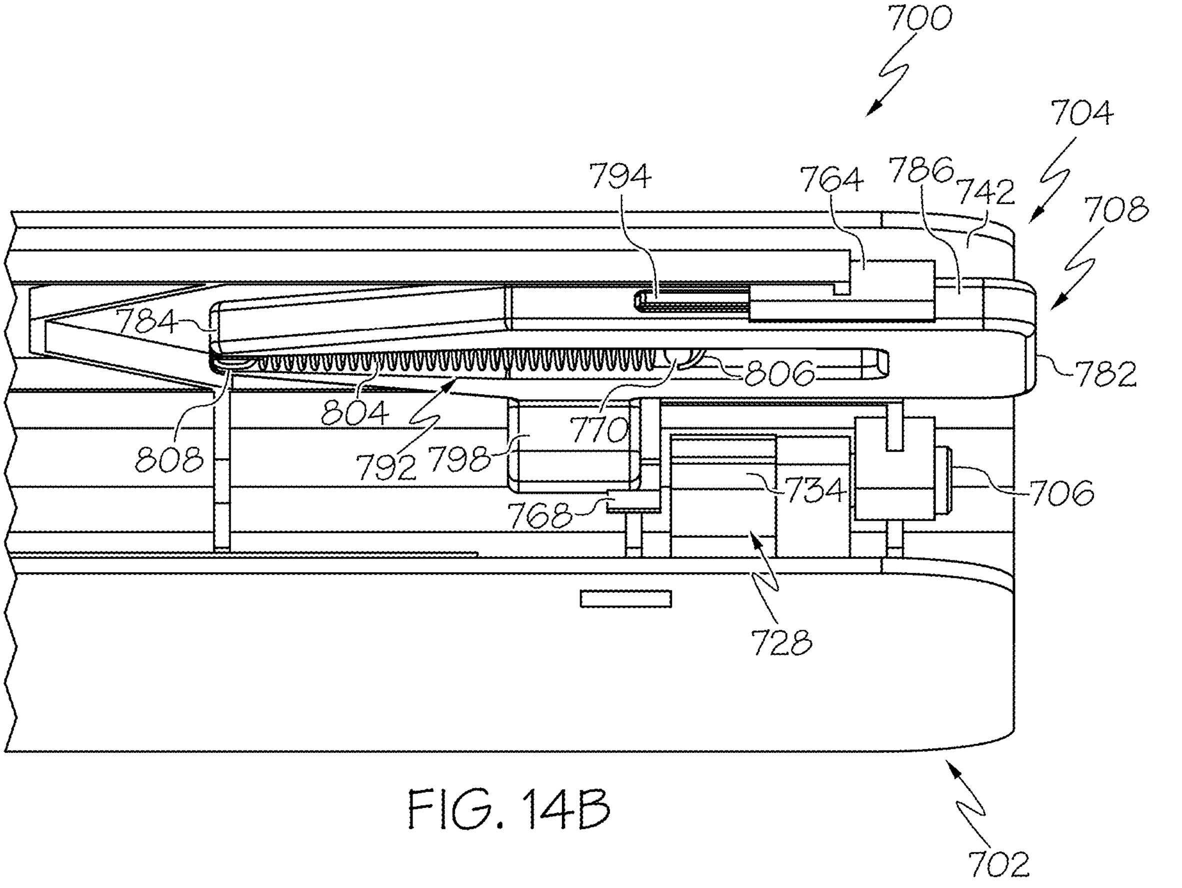
FIG. 14B schematically depicts a partial end view of the intubation assistance device of FIG. 10 with the handle in an unbiased position, according to one or more embodiments shown and described herein.

Referring now to FIGS. 14A and 14B, the handle 708 is shown provided at the lower surface 742 of the pivot plate 704 and positioned between a biased position and an unbiased position, respectively. The first protrusion 794 on the first edge 786 of the handle 708 is received within the first handle catch groove 772 of the first handle catch 764. Although not shown in FIG. 14A, but shown in FIG. 15A, the second protrusion 796 on the second edge 788 of the handle 708 is received within the second handle catch groove 774 of the second handle catch 766. The engagement of the first handle catch 764 with the first protrusion 794, as well as the second handle catch 766 with the second protrusion 796, stabilizes the handle 708 and limits movement of the handle 708 relative to the pivot plate 704 in a lateral direction.

As shown in FIGS. 14A and 14B, a biasing member 804 is received within the cutout 792. The biasing member 804 has a first end 806 and a second end 808 opposite the first end 806. The first end 806 of the biasing member 804 is engaged with the spring receiving member 770 extending from the lower surface 742 of the pivot plate 704, and the second end 808 of the biasing member 804 is engaged with the reduced diameter portion 790 of the inner end 784 of the handle 708. In embodiments, the biasing member 804 is a spring. Accordingly, the biasing member 804 provides a biasing force to draw the handle 708 in an outward lateral direction as shown by arrow A9 and position the handle 708 in the biased position, as shown in FIG. 14A.

As shown in FIG. 14A, with the handle 708 in the biased position, the handle 708 is moved in the outward lateral direction of arrow A9 such that the lateral wall 802 of the latch 798 is at least partially received within the upper retainer groove 734 of the latch retainer 728. However, based on the orientation of the pivot plate 704 relative to the lower plate 702, the lateral wall 802 of the latch 798 may be received within the lower retainer groove 736 or at the upper surface 730 of the latch retainer 728. In embodiments, with the handle 708 in the biased position, the lateral wall 802 of the latch 798 is also partially received within the latch catch groove 776 of the latch catch 768 to further stabilize the lateral movement of the handle 708 while in the biased position.

As shown in FIG. 14B, with the handle 708 in the unbiased position, the handle 708 is moved in an inward lateral direction of arrow A10 opposite the outward lateral direction of arrow A9 such that the lateral wall 802 of the latch 798 is not received within the latch retainer 728. Accordingly, the pivot plate 704 is free to rotate relative to the lower plate 702 about the pivot axis 726. In embodiments, with the handle 708 in the unbiased position, the lateral wall 802 of the latch 798 is partially received within the latch catch groove 776 of the latch catch 768 to further stabilize the lateral movement of the handle 708 while in the unbiased position. With the handle 708 in the unbiased position, a length of the biasing member 804 is extended to increase the tension on the handle 708. Once an exterior force applied against the handle 708 is eliminated, such as by a user pressing inwardly against the outer end 782 of the handle 708, the biasing member 804 provides a biasing force encouraging the handle 708 to return to the biased position, as shown in FIG. 14A. It should be appreciated that the other handle 708 on the opposite side of the intubation assistance device 700 engages the pivot plate 704 and the lower plate 702 in the same manner as that described herein.

Although operation of intubation assistance device 700 is described herein as permitting the pivot plate 704 to move relative to the lower plate 702 by pushing the handles 708 in an inward lateral direction toward one another, it should be appreciated that the intubation assistance device 700 may be modified such that the pivot plate 704 may be alternatively permitted to move relative to the lower plate 702 by pulling the handles 708 in an opposite outward direction away from one another. Such modification would require repositioning the biasing member 804 to apply an opposite biasing effect. However, such modifications are contemplated as being within the scope of the present disclosure.

Figure 15A:
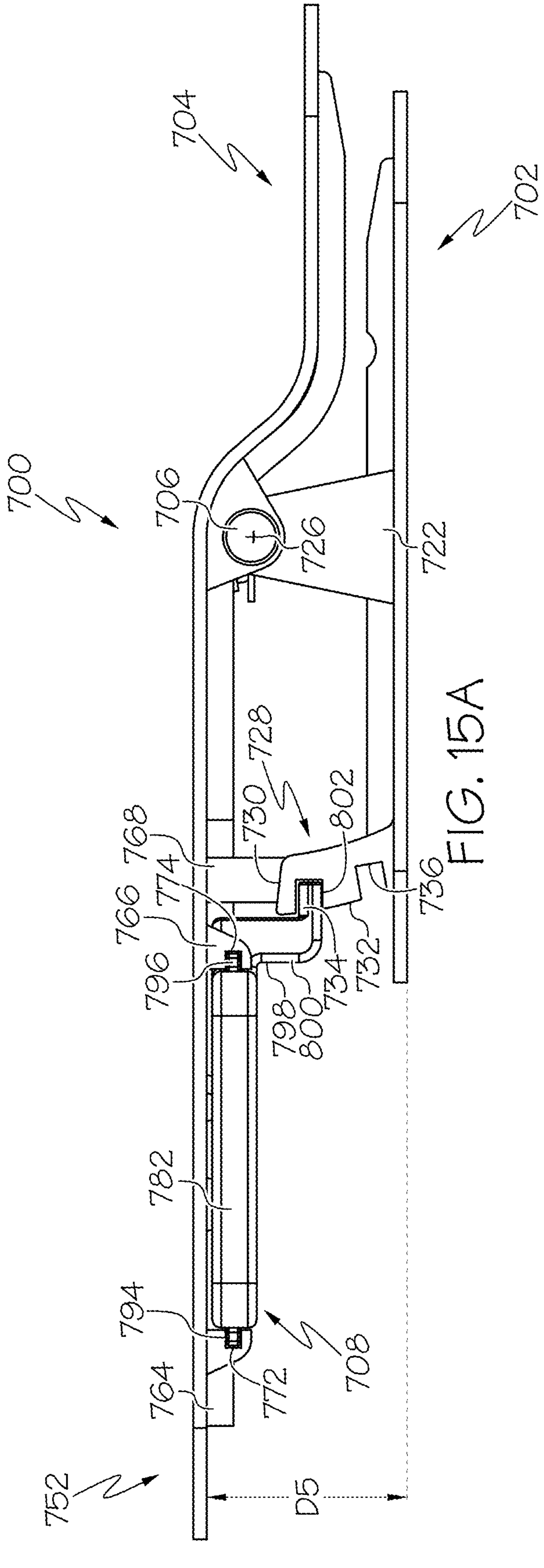
FIG. 15A schematically depicts a side end view of the intubation assistance device of FIG. 10 in the neutral position, according to one or more embodiments shown and described herein.
Figure 15B:
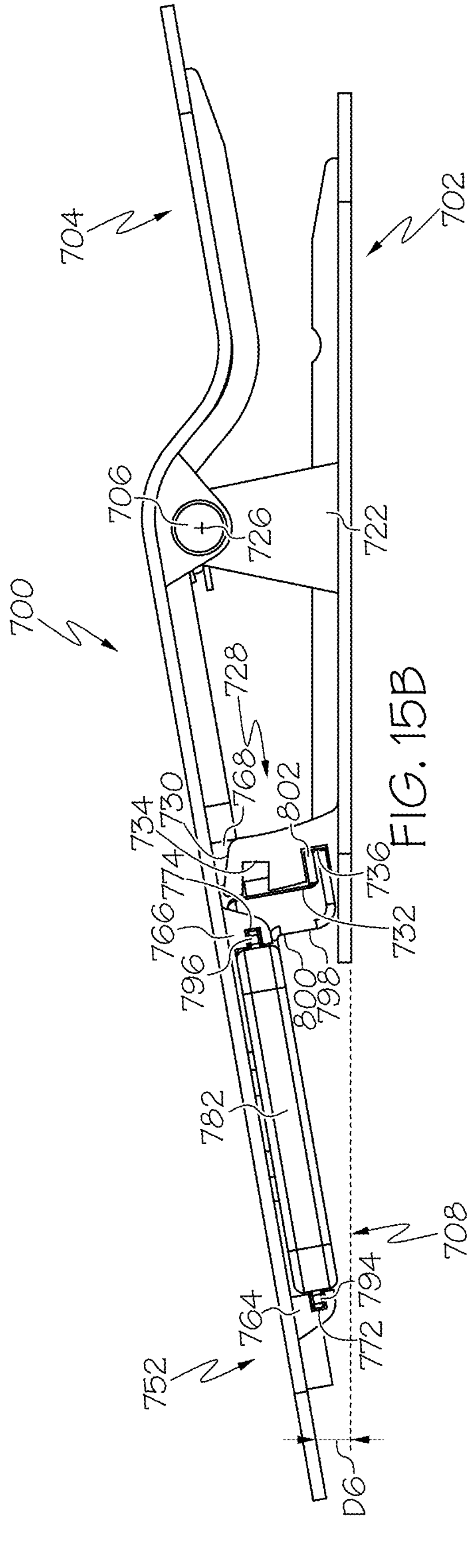
FIG. 15B schematically depicts a side end view of the intubation assistance device of FIG. 10 in a raised position, according to one or more embodiments shown and described herein.
Figure 15C:
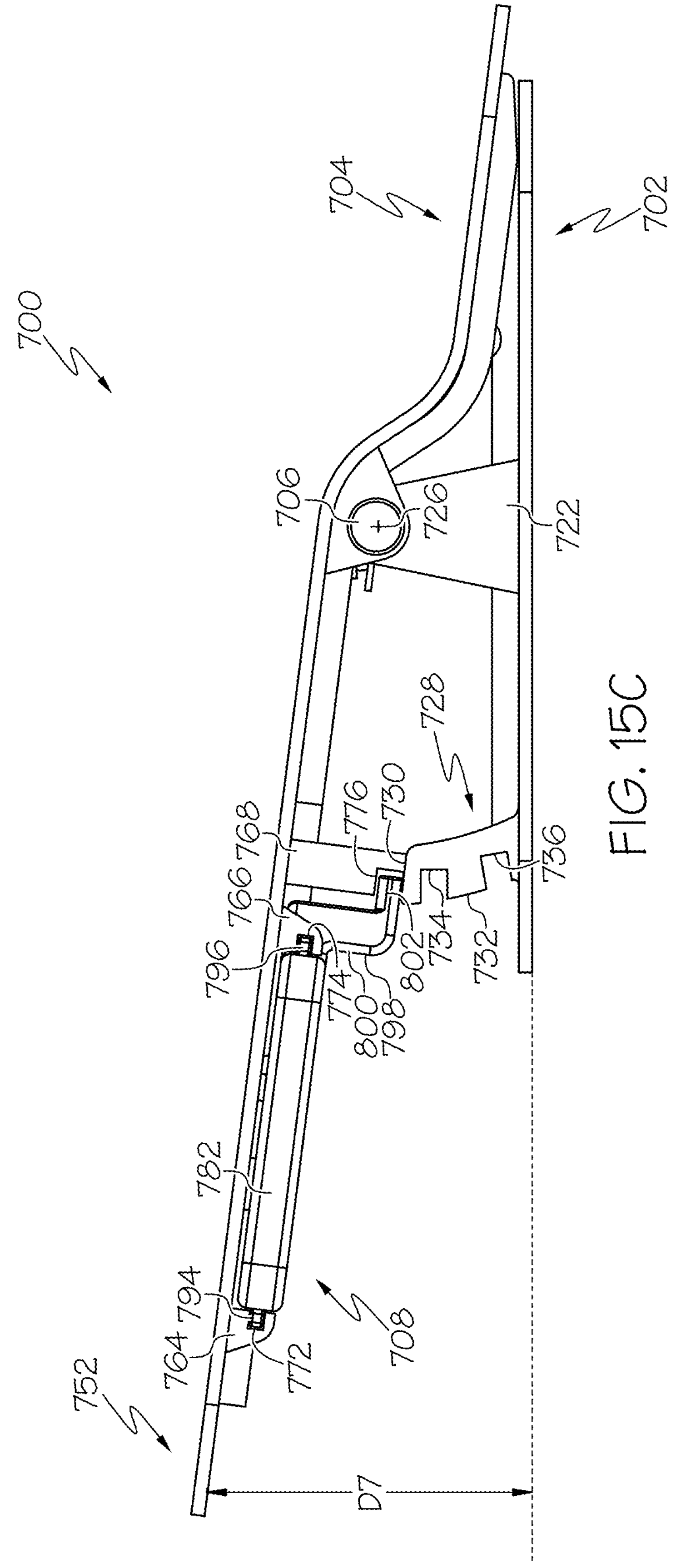
FIG. 15C schematically depicts a side end view of the intubation assistance device of FIG. 10 in a lowered position, according to one or more embodiments shown and described herein.

Referring now to FIGS. 15A-15C, the various positions of the pivot plate 704 relative to the lower plate 702 are depicted. Specifically, FIG. 15A depicts the pivot plate 704 in a neutral position, FIG. 15B depicts the pivot plate 704 in a raised position, and FIG. 15C depicts the pivot plate 704 in a lowered position. As described herein, the pivot plate 704 rotates between the neutral position, the raised position, and the lowered position about the pivot axis 726 defined by the pin 706 which extends through the lower flange 722 of the lower plate 702 and the upper flange 758 of the pivot plate 704.

In embodiments, the intubation assistance device 700 is positioned below the person support surface 23, such as between the person support surface 23 and the deck 22 (FIG. 1). In other embodiments, the intubation assistance device 700 is positioned within the person support surface 23 itself. In other embodiments, the intubation assistance device 700 may be positioned at or on an upper surface of the person support surface 23 to directly contact the shoulders of the person. In either embodiment, the shoulder portion 754 of the pivot plate 704 applies pressure against the shoulders of the person, and the head portion 752 of the pivot plate 704 applies pressure against the head of the person based on the particular orientation of the pivot plate 704.

As shown in FIG. 15A, with the pivot plate 704 in the neutral position and the handle in the biased position, the lateral wall 802 of the latch 798 is received within the upper retainer groove 734 of the latch retainer 728. Additionally, with the pivot plate 704 in the neutral position, the upper surface 740 of the pivot plate 704 at the head portion 752 and the shoulder portion 754 is substantially horizontal and parallel to the lower surface 712 of the lower plate 702, with a distance D5 defined between the head portion 752 of the pivot plate 704 and a plane extending parallel from the lower plate 702. Accordingly, the person positioned on the person support surface 23 is in a planar position.

As shown in FIG. 15B, with the pivot plate 704 in the raised position and the handle 708 in the biased position, the lateral wall 802 of the latch 798 is received within the lower retainer groove 736 of the latch retainer 728. Additionally, with the pivot plate 704 in the raised position, a distance D6 is defined between the head portion 752 of the pivot plate 704 and a plane extending parallel to the lower plate 702. The distance D6 is less than the distance D5 between the head portion 752 of the pivot plate 704 and the lower plate 702 when the pivot plate 704 is in the neutral position. Accordingly, the shoulder portion 754 of the pivot plate 704 applies a force against the shoulders of the person positioned on the person support surface 23 to raise the shoulders of the person while permitting the head of the person to be lowered.

As shown in FIG. 15C, with the pivot plate 704 in the lowered position and the handle 708 in the biased position, the lateral wall 802 of the latch 798 abuts against the upper surface 730 of the latch retainer 728. Additionally, with the pivot plate 704 in the lowered position, a distance D7 is defined between the head portion 752 of the pivot plate 704 and the lower plate 702. The distance D7 is greater than the distance D5 between the head portion 752 of the pivot plate 704 and the lower plate 702 when the pivot plate 704 is in the neutral position. Accordingly, the head portion 752 of the pivot plate 704 applies a force against the head of the person positioned on the person support surface 23 to raise the head of the person while permitting the shoulders of the person to be lowered.

From the above, it is to be appreciated that defined herein are intubation assistance devices, person support surfaces including intubation assistance devices, and person support apparatus including the same. A person support surface includes a support body and an intubation assistance device positionable within the support body. The intubation assistance device is positionable between a first position and a second position relative to the support body to adjust a position of shoulders of a person positioned on an upper surface of the support body. Other embodiments of intubation assistance devices include an elevated platform moveable relative to a lower plate to raise the shoulders of a person positioned atop a person support surface, and a pivot plate pivotally coupled to the lower plate to support a head of the person as the shoulders are raised.

Further aspects of the embodiments described herein are provided by the subject matter of the following clauses:

A person support surface, comprising: a support body having a head end and a foot end opposite the head end, an upper surface, a lower surface opposite the upper surface, and a cavity formed in the support body; and an intubation assistance device positionable within the support body, the intubation assistance device positionable between a first position and a second position relative to the support body to adjust a position of shoulders of a person positioned on the upper surface of the support body.

The person support surface of any preceding clause, wherein the intubation assistance device comprises a removable support block.

The person support surface of any preceding clause, wherein the removable support block is pivotally coupled to the support body to rotate between a first position within the cavity and a second position at the lower surface of the support body outside of the cavity.

The person support surface of any preceding clause, wherein the removable support block has a trapezoidal prism shape.

The person support surface of any preceding clause, wherein the support body includes a first attachment mechanism and the removable support block includes a second attachment mechanism engaging the first attachment mechanism.

The person support surface of any one of clause 5, wherein the first attachment mechanism is a first track and the second attachment mechanism is a second track that slidably engages the first track to permit the removably support block to slide relative to the support body.

The person support surface of any preceding clause, wherein the intubation assistance device comprises a flap formed at the upper surface of the person support surface defined by a cut, the flap being rollable onto itself.

The person support surface of any preceding clause, wherein the flap has a thickness equal to or greater than 5% and less than or equal to 30% of a thickness of the support body.

The person support surface of any preceding clause, wherein the flap has a length defined between the head end and the foot end of the support body, the length of the flap extending equal to or greater than 10% and less than or equal to 30% of a length of the support body.

The person support surface of any preceding clause, wherein the intubation assistance device comprises a mat.

The person support surface of any preceding clause, wherein the mat comprises a displaced end and a fixed end opposite the displaced end, a bulge is formed in the mat when the displaced end is moved closer to the fixed end.

The person support surface of any preceding clause, wherein the mat comprises a rigid portion and a flexible portion having a rigidity less than the rigid portion, the bulge formed in the flexible portion.

The person support surface of any one of any preceding clause, wherein the mat is formed from a material selected from at least one of rubber, vinyl, polyethylene, polypropylene, PVC (polyvinyl chloride), silicone, leather, and foam.

An intubation assistance device, comprising: a lower plate; an elevated platform; and one or more pivot arms pivotally coupling the lower plate to the elevated platform, wherein the intubation assistance device is positionable between a lowered position in which the elevated platform is spaced apart from the lower plate by a first distance, and wherein the intubation assistance device is positionable between a raised position in which the elevated platform is spaced apart from the lower plate by a second distance greater than the first distance.

The intubation assistance device of any preceding clause, wherein the one or more pivot arms comprises a plurality of pivot arms.

The intubation assistance device of any preceding clause, wherein: the lower plate comprises a plurality of lower flanges provided on an upper surface of the lower plate; the elevated platform comprises a plurality of upper flanges provided on a lower surface of the elevated platform; and each pivot arm of the plurality of pivot arms is rotatably coupled to a respective lower flange and a respective upper flange.

The intubation assistance device of any preceding clause, wherein each pivot arm of the plurality of pivot arms comprises an upper abutment surface, a lower abutment surface opposite the lower abutment surface, and a side abutment surface extending perpendicular to the upper abutment surface and a lower abutment surface.

The intubation assistance device of any preceding clause, wherein: the side abutment surface abuts against an upper surface of the lower plate when the intubation assistance device is in the lowered position; and the lower abutment surface abuts against the upper surface of the lower plate when the intubation assistance device is in the raised position.

The intubation assistance device of any preceding clause, wherein each pivot arm includes a first pivot arm portion extending between and rotatably connected to an upper flange of the elevated platform and a lower flange of the lower plate.

The intubation assistance device of any preceding clause, wherein each pivot arm includes a second pivot arm portion extending from an end of the first pivot arm portion opposite the upper flange, the second pivot arm portion extends from the end of the first pivot arm portion at a pivot arm angle.

The intubation assistance device of any preceding clause, wherein the pivot arm angle is greater than 90 degrees and less than 180 degrees.

The intubation assistance device of any preceding clause, further comprising: a roller; one or more rear linkage arms interconnecting a pair of adjacent second pivot arm portions; and one or more front linkage arms interconnecting a second pivot arm portion of a respective pivot arm and the roller.

The intubation assistance device of any preceding clause, further comprising: a pair of rollers; a pair of rear linkage arms interconnecting a pair of adjacent second pivot arm portions; and a pair of front linkage arms interconnecting a second pivot arm portion of a respective pivot arm and a respective roller of the pair of rollers.

The intubation assistance device of any preceding clause, wherein the one or more rear linkage arms are pivotally connected to the one or more front linkage arms.

The intubation assistance device of any preceding clause, further comprising a track, wherein the roller is positioned at a first end of the track when the intubation assistance device is in the lowered position, and wherein the roller is positioned at a second end of the track opposite the first end of the track when the intubation assistance device is in the raised position.

The intubation assistance device of any preceding clause, further comprising a pivot plate pivotally coupled to the elevated platform.

The intubation assistance device of any preceding clause, further comprising one or more pivot plate supports pivotally coupled to the lower surface of the elevated platform, the pivot plate fixed to the one or more pivot plate supports.

The intubation assistance device of any preceding clause, wherein the pivot plate is oriented at a pivot plate angle relative to the elevated platform when the intubation assistance device is in the raised position.

The intubation assistance device of any preceding clause, wherein the pivot plate is greater than 0 degrees and less than 90 degrees.

An intubation assistance device comprising: a lower plate; a pivot plate pivotally coupled to the lower plate; and one or more handles positionable between a biased position in which movement of the pivot plate relative to the lower plate is inhibited, and an unbiased position in which rotation of the pivot plate relative to the lower plate about a pivot axis is permitted, wherein the pivot plate is selectively positionable between a neutral position, a raised position, and a lowered position relative to the lower plate.

The intubation assistance device of any preceding clause, wherein the one or more handles comprises a pair of handles moveable in opposite directions when positioned in the biased position and the unbiased position.

The intubation assistance device of any preceding clause, wherein: the lower plate comprises a plurality of lower flanges provided on an upper surface of the lower plate; the pivot plate comprises a plurality of upper flanges provided on a lower surface of the pivot plate; and a pin extending through the plurality of lower flanges and the plurality of upper flanges to pivotally couple the lower plate to the pivot plate, the pin defining the pivot axis.

The intubation assistance device of any preceding clause, wherein the lower plate comprises a latch retainer having an upper surface and an outer surface extending between the upper surface of the latch retainer and an upper surface of the lower plate, an upper retainer groove is formed within the outer surface of the latch retainer, and a lower retainer groove is formed within the outer surface of the latch retainer between the upper retainer groove and the lower surface of the lower plate.

The intubation assistance device of any preceding clause, wherein the one or more handles comprises a latch including an upstanding wall extending from a side edge of the handle and a lateral wall extending from an end of the upstanding wall.

The intubation assistance device of any preceding clause, wherein the lateral wall of the latch is received within the upper retainer groove of the latch retainer when the pivot plate is in the neutral position, wherein the lateral wall of the latch is received within the lower retainer groove of the latch retainer when the pivot plate is in the raised position, the lateral wall of the latch is positioned on the upper surface of the latch retainer when the pivot plate is in the lowered position.

The intubation assistance device of any preceding clause, wherein the lateral wall extends perpendicular to the upstanding wall.

The intubation assistance device of any preceding clause, wherein the one or more handles comprises: a first protrusion provided on a first side edge of the one or more handles; and a second protrusion provided on a second side edge of the one or more handles opposite the first side edge of the one or more handles.

The intubation assistance device of any preceding clause, wherein the pivot plate comprises one or more handle receiving areas, each handle receiving area comprising: a first handle catch having a first handle catch groove for receiving the first protrusion of the one or more handles; a second handle catch having a second handle catch groove for receiving the second protrusion of the one or more handles; a latch catch having a latch catch groove; and a spring receiving member.

The intubation assistance device of any preceding clause, wherein the one or more handles comprises: a spring having a first end and a second end opposite the first end; a latch including an upstanding wall extending from the second side edge of the one or more handles and a lateral wall extending from an end of the upstanding wall; and a reduced diameter portion formed at an end of the one or more handles, wherein the first end of the spring engages the spring receiving member, and the second end of the spring engages the reduced diameter portion of the one or more handles, and wherein the latch is received within the latch catch groove of the latch catch.

The intubation assistance device of any preceding clause, wherein the pivot plate comprises: a head portion; a shoulder portion located at a different plane than the head portion; and a transition portion extending between the head portion and the shoulder portion, the transition portion being curved to provide a smooth transition between the head portion and the shoulder portion.

The intubation assistance device of any preceding clause, wherein a distance defined between the head portion of the pivot plate and the lower plate when the pivot plate is in the neutral position is greater than a distance between the head portion of the pivot plate and the lower plate when the pivot plate is in the raised position.

The intubation assistance device of any preceding clause, wherein a distance defined between the head portion of the pivot plate and the lower plate when the pivot plate is in the neutral position is less than a distance between the head portion of the pivot plate and the lower plate when the pivot plate is in the lowered position.

A person support surface comprising: a support body having a head end and a foot end opposite the head end, an upper surface configured to support a person, a lower surface opposite the upper surface, and a cavity formed in the support body; and a platform positionable within the support body, the platform positionable between a first position and a second position relative to the support body to adjust a position of shoulders of a person positioned on the upper surface of the support body relative to a head of the person so as to position the head of the person backward at an angle for intubation.

The person support surface of any preceding clause, wherein the backward angle allows for the oral axis and laryngeal axis to be greater than 90 degrees.

The person support surface of any preceding clause, wherein the platform is formed at least partially from the lower surface of the support body.

The person support surface of any preceding clause, wherein the platform comprises a removable support block pivotally coupled to the support body to rotate between a first position within the cavity and a second position at the lower surface of the support body outside of the cavity.

The person support surface of any preceding clause, wherein the support body includes a first attachment mechanism and the platform includes a second attachment mechanism engaging the first attachment mechanism.

The person support surface of any preceding clause, wherein the first attachment mechanism is a first track and the second attachment mechanism is a second track that slidably engages the first track to permit the platform to slide relative to the support body.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A person support surface, comprising:

a support body having a head end and a foot end opposite the head end, an upper surface, a lower surface opposite the upper surface, a cavity formed in the support body, and a first track; and an intubation assistance device positionable within the support body, the intubation assistance device positionable between a first position and a second position relative to the support body to adjust a position of shoulders of a person positioned on the upper surface of the support body, the intubation assistance device comprising a removable support block including a second track slidably engaging the first track to permit the removable support block to slide along the lower surface of the support body outside of the cavity.

2. The person support surface of claim 1, wherein the cavity is formed in the lower surface of the support body.

3. The person support surface of claim 1, wherein:

the support body has a pair of sides extending between the upper surface and the lower surface of the support body; and the cavity extends through the pair of sides of the support body.

4. The person support surface of claim 1, wherein a shape of the cavity corresponds to a shape of the intubation assistance device.

5. The person support surface of claim 1, wherein the shape of the intubation assistance device is a trapezoidal prism.

6. The person support surface of claim 1, wherein the intubation assistance device is removable from the support body.

* * * * *